US012568493B2

(12) United States Patent
Dudda et al.

(10) Patent No.: US 12,568,493 B2
(45) Date of Patent: Mar. 3, 2026

(54) MULTIPLE DOWNLINK SEMI-PERSISTENT SCHEDULING CONFIGURATIONS FOR NEW RADIO INTERNET OF THINGS

(71) Applicant: Telefonaktiebolaget LM Ericsson (PUBL), Stockholm (SE)

(72) Inventors: Torsten Dudda, Wassenberg (DE); John Walter Diachina, Garner, NC (US); Zhenhua Zou, Solna (SE); Henrik Enbuske, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 454 days.

(21) Appl. No.: 17/598,281

(22) PCT Filed: Mar. 24, 2020

(86) PCT No.: PCT/EP2020/058223
§ 371 (c)(1),
(2) Date: Sep. 26, 2021

(87) PCT Pub. No.: WO2020/193582
PCT Pub. Date: Oct. 1, 2020

(65) Prior Publication Data
US 2022/0183040 A1 Jun. 9, 2022

Related U.S. Application Data

(60) Provisional application No. 62/825,554, filed on Mar. 28, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/0446* (2013.01);
(Continued)

(58) Field of Classification Search
None
See application file for complete search history.

(56) References Cited

U.S. PATENT DOCUMENTS 11,503,587 B2 * 11/2022 Khoshnevisan ...... H04W 72/23
2015/0365831 A1 * 12/2015 Ko .......................... H04L 5/001
370/329
(Continued)

FOREIGN PATENT DOCUMENTS

EP          3395109 A1    10/2018
WO    WO2017078372 A1     5/2017
WO       2019 022471 A1    1/2019

OTHER PUBLICATIONS

Patent Office Opinion Submission Notice issued for Korean Patent Application No. 10-2021-7035214—Mar. 3, 2023.
(Continued)

*Primary Examiner* — Gregory B Sefcheck
(74) *Attorney, Agent, or Firm* — Baker Botts L.L.P.

(57) ABSTRACT
A method by a wireless device (110) includes receiving a first Downlink Semi-Persistent Scheduling (DL SPS) assignment and a second DL SPS assignment from a network node (160). At least one resource associated with the first DL SPS assignment and at least one resource associated with the second DL SPS assignment are at least partially overlapping. The wireless device compares priority information associated with each of the first DL SPS assignment and the second DL SPS assignment and selects a one of the first DL SPS assignment and the second DL SPS assignment that has a higher priority based on the priority information. The wireless device attempts to decode the Physical Downlink
(Continued)

Shared Channel (PDSCH) according to the selected one of the first DL SPS assignment and the second DL SPS assignment that has the higher priority.

21 Claims, 15 Drawing Sheets

(51) Int. Cl.

| | | |
|---|---|---|
| *H04W 72/0446* | (2023.01) | |
| *H04W 72/0453* | (2023.01) | |
| *H04W 72/23* | (2023.01) | |
| *H04W 72/566* | (2023.01) | |

(52) U.S. Cl.
CPC ....... *H04W 72/0453* (2013.01); *H04W 72/23* (2023.01); *H04W 72/569* (2023.01)

(56) References Cited

U.S. PATENT DOCUMENTS

| | | | | |
|---|---|---|---|---|
| 2018/0007667 | A1* | 1/2018 | You | H04L 5/0051 |
| 2018/0049193 | A1* | 2/2018 | Belleschi | H04W 72/0446 |
| 2018/0324772 | A1 | 11/2018 | Babaei et al. | |
| 2019/0116608 | A1* | 4/2019 | Kim | H04W 72/1263 |
| 2019/0313436 | A1* | 10/2019 | Lee | H04L 5/0051 |
| 2020/0084783 | A1* | 3/2020 | Li | H04L 5/0033 |
| 2020/0106586 | A1* | 4/2020 | Nemeth | H04L 1/1854 |
| 2020/0146040 | A1* | 5/2020 | Lee | H04W 72/23 |
| 2020/0163083 | A1* | 5/2020 | Yu | H04W 72/044 |
| 2020/0205141 | A1* | 6/2020 | Khoshnevisan | H04L 5/0055 |
| 2020/0205166 | A1* | 6/2020 | Huang | H04W 68/005 |
| 2020/0213975 | A1* | 7/2020 | Chae | H04W 72/02 |
| 2020/0221474 | A1* | 7/2020 | Lee | H04W 72/23 |
| 2020/0228190 | A1* | 7/2020 | Cirik | H04L 5/0051 |
| 2020/0245333 | A1* | 7/2020 | Lin | H04L 1/0026 |
| 2020/0245335 | A1* | 7/2020 | Joseph | H04W 72/20 |
| 2020/0280357 | A1* | 9/2020 | Bae | H04W 24/10 |
| 2020/0305169 | A1* | 9/2020 | Loehr | H04W 28/0278 |
| 2020/0374911 | A1* | 11/2020 | Lee | H04L 5/0007 |
| 2021/0084668 | A1* | 3/2021 | Ahmed | H04W 72/543 |
| 2021/0211241 | A1* | 7/2021 | Xiong | H04L 1/1896 |
| 2021/0345362 | A1* | 11/2021 | Kim | H04W 28/02 |
| 2022/0078768 | A1* | 3/2022 | El Hamss | H04L 5/0055 |
| 2022/0109527 | A1* | 4/2022 | Hwang | H04L 1/1825 |

OTHER PUBLICATIONS

3GPP TSG-RAN WG2 Meeting 105; Athens, Greece, Feb. 25-Mar. 1, 2019; Source: CATT Title: Multiple active SPS and Configured Grant Configurations Agenda Item: 11.7.2.2.

3GPP TSG-RAN WG1 Ad-Hoc Meeting 1901; Taipei, Taiwan, Jan. 21-25, 2019; Agenda item: 7.2.6.4 Source: Nokia, Nokia Shanghai Bell Title: Summary of Discussions on UL/DL Intra-UE Prioritization/Multiplexing.

3GPP TSG RAN WG1 Meeting #95; Spokane, USA; Draft Change Request; Title: Correction on DL SPS transmission in 38.214; Source to WG: Spreadtrum Communications; Source to TSG: R1 (R1-1813071)—Nov. 12-16, 2018.

PCT International Search Report issued for International application No. PCT/EP2020/058223—Jul. 2, 2020.

PCT Written Opinion of the International Searching Authority issued for International application No. PCT/EP2020/058223—Jul. 2, 2020.

Official Action issued by the Republic of Columbia for International Application No. PCT/EP2020/058223—Jan. 5, 2024.

Resolution No. 25817 issued by the Republic of Columbia dated May 15, 2017, related to PCT/US2013/070920 (attached herewith).

3GPP TSG-RAN WG2 Meeting #105; Athens, Greece, Feb. 25-Mar. 1, 2019; Agenda Item: 11.7.2.2; Source: Nokia, Nokia Shanghai Bell; Title: Further discussion on QoS and scheduling enhancements for TSN (R2-1900636).

Notice of Submission of Opinion issue for Korean Patent Application No. 10-2024-7004254—Dec. 10, 2024 (machine translation attached).

* cited by examiner

1000

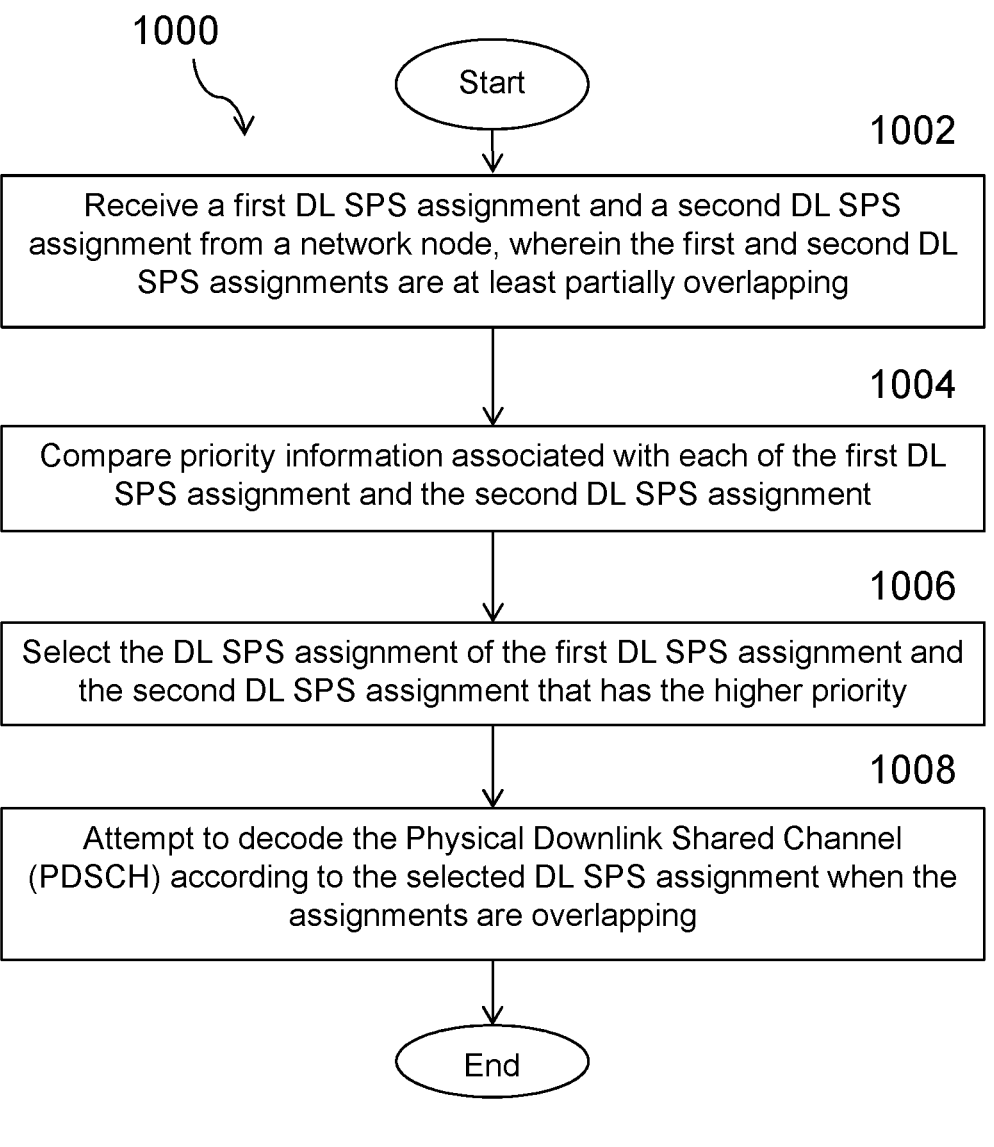

1002

Start

Receive a first DL SPS assignment and a second DL SPS assignment from a network node, wherein the first and second DL SPS assignments are at least partially overlapping

1004

Compare priority information associated with each of the first DL SPS assignment and the second DL SPS assignment

1006

Select the DL SPS assignment of the first DL SPS assignment and the second DL SPS assignment that has the higher priority

1008

Attempt to decode the Physical Downlink Shared Channel (PDSCH) according to the selected DL SPS assignment when the assignments are overlapping End

FIGURE 12

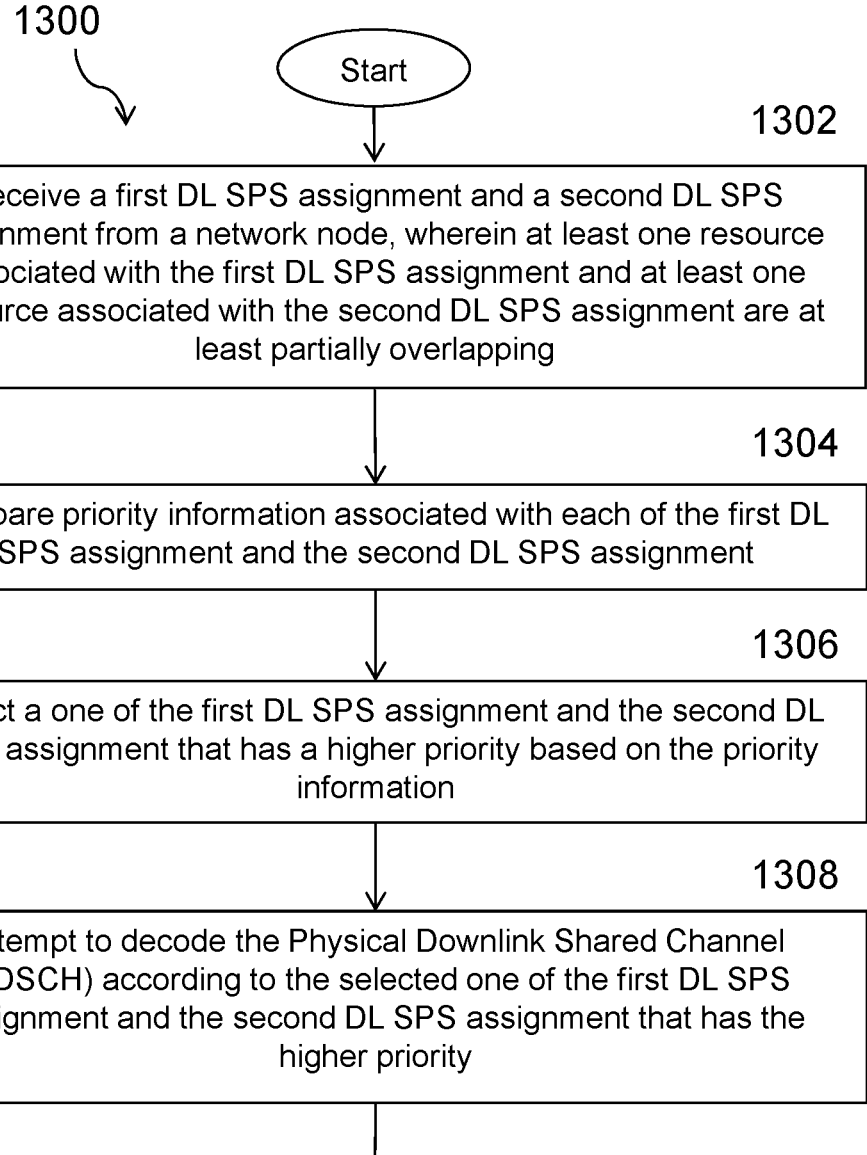

1300

Start

1302

Receive a first DL SPS assignment and a second DL SPS assignment from a network node, wherein at least one resource associated with the first DL SPS assignment and at least one resource associated with the second DL SPS assignment are at least partially overlapping

1304

Compare priority information associated with each of the first DL SPS assignment and the second DL SPS assignment

1306

Select a one of the first DL SPS assignment and the second DL SPS assignment that has a higher priority based on the priority information

1308

Attempt to decode the Physical Downlink Shared Channel (PDSCH) according to the selected one of the first DL SPS assignment and the second DL SPS assignment that has the higher priority End

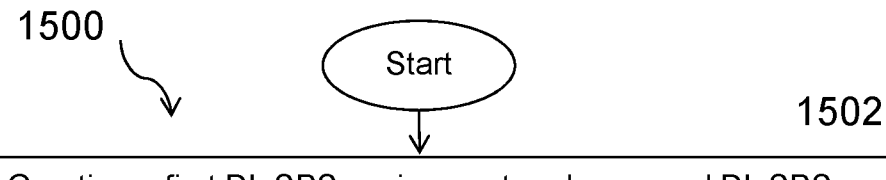

Start

1502

Granting a first DL SPS assignment and a second DL SPS assignment to a wireless device, wherein at least one resource associated with the first DL SPS assignment and at least one resource associated with the second DL SPS assignment are at least partially overlapping

1504

Transmit DL data to the wireless device using only one of the first DL SPS assignment and the second DL assignment that has a higher priority based on priority information associated with the first and second DL SPS assignments End

FIGURE 17

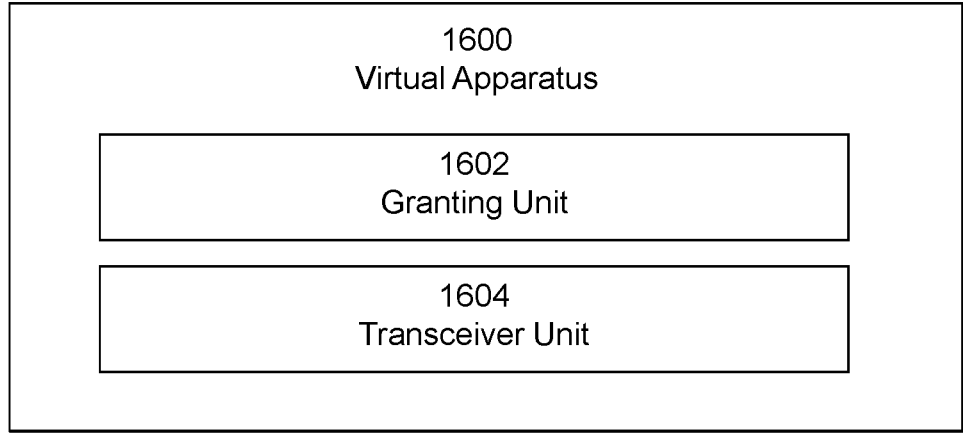

1600
Virtual Apparatus

1602
Granting Unit

1604
Transceiver Unit

FIGURE 18

MULTIPLE DOWNLINK SEMI-PERSISTENT SCHEDULING CONFIGURATIONS FOR NEW RADIO INTERNET OF THINGS

PRIORITY

This nonprovisional application is a U.S. National Stage Filing under 35 U.S.C. § 371 of International Patent Application Serial No. PCT/EP2020/058223 filed Mar. 24, 2020 and entitled "Multiple Downlink Semi-Persistent Scheduling Configurations for New Radio Internet of Things" which claims priority to U.S. Provisional Patent Application No. 62/825,554 filed Mar. 28, 2019 both of which are hereby incorporated by reference in their entirety.

TECHNICAL FIELD

The present disclosure relates, in general, to wireless communications and, more particularly, systems and methods for prioritizing among multiple downlink-semi-persistent scheduling (DL-SPS) configurations for New Radio Internet of Things (NR-IoT).

BACKGROUND

The present disclosure is described within the context of 3rd Generation Partnership Project (3GPP) New Radio (NR) radio technology (3GPP TS 38.300 V15.2.0 (2018 May)). It is understood, that the problems and solutions described herein are equally applicable to wireless access networks and user equipments (UEs) implementing other access technologies and standards. NR is used as an example technology where the techniques and systems described herein are suitable, and using NR in the description therefore is particularly useful for understanding the problem and solutions solving the problem. In particular, the disclosure is applicable also to 3GPP Long-Term Evolution (LTE), or 3GPP LTE and NR integration, also denoted as non-standalone NR.

In the 3GPP study item (RP-182090, Revised SID: Study on NR Industrial Internet of Things (IIoT)), NR technology enhancements are studied with the target of providing more deterministic low-latency delivery of data. This traffic is also referred to as time sensitive networking (TSN) traffic with typically periodic packet occurrences per cycle time.

Downlink (DL) traffic can be scheduled with dynamic downlink assignments or configured downlink assignments, which is also known as semi-persistent scheduling (SPS) in the DL, referred to as DL SPS. In case of dynamic assignments, the network node, such as, for example, the next generation base station (gNB), provides a downlink assignment via downlink control information (DCI) in Physical Downlink Control Channel (PDCCH) alongside each downlink data transmission on the Physical Downlink Shared Channel (PDSCH). In DL SPS, the downlink assignments are provided only once via DCI PDCCH and thereupon configured in the UE, thus becoming valid for usage of reception of recurring PDSCH. The recurrence is configured with a certain periodicity.

A typical New Radio-Internet of Things (NR-IIoT) device would handle communication for multiple service types such as, for example, multiple periodic Ultra-reliable low-latency communication (URLLC) type robot control messages (also referred to as TSN-like traffic), URLLC type of occasional alarm signals (for which periodic resources would need to be configured or relying on UE to send scheduling request for each occasional alarm message), occasional sensor data transmission (can be time-critical or non-time-critical), other Enhanced Mobile Broadband (eMBB) or other Mobile Broadband (MBB) best-effort type traffic such as occasional video transmissions or software updates. It would lead to a traffic mix to be multiplexed by the gNB for DL transmissions. In such a traffic mix scenario, it is crucial to treat URLLC-type of traffic with high priority. Multiple of those critical traffic streams may need to be transmitted via the gNB at recurring time intervals. Therefore, it has been proposed to utilize multiple DL SPS configurations simultaneously, for which each could be aligned with a periodic DL traffic flow. As used herein, the terms DL SPS configuration and DL SMS assignment are used synonymously.

The 3GPP study from RP-182090 concluded that it is feasible to support those multiple DL SPS configurations, and furthermore DL SPS configurations with short periodicities, in order to match the short periodicities of the expected NR-IIOT traffic.

The following assumptions are considered for the design of DL SPS for NR-IIOT, to be consistent with the design of already specified multiple UL SPS configurations from LTE Rel-15:

The UE can be configured by radio resource control (RRC) with list of DL SPS configurations, each with its own configuration parameter values, and each identified by an index.

DL SPS configurations for the UE are individually dynamically activated and deactivated by PDCCH DCI signalling, which e.g. includes an index to a specific DL SPS configuration.

There currently exist certain challenges. In particular, it is unclear how to manage overlapping resources associated with DL assignments of those multiple simultaneously active DL SPS configurations in the UE. For example, it is not understood how the UE may decide which DL SPS assignment the UE should prioritize based on what criteria. Furthermore, the overlapping resources may occur in frequency domain only, time domain only or in both domains.

SUMMARY

Certain aspects of the present disclosure and their embodiments may provide solutions to these or other challenges. For example, according to certain embodiments disclosed herein, methods and systems are provided for handling when radio resources provided by different DL SPS assignments to the same UE overlap.

According to certain embodiments, a method by a wireless device includes receiving a first Downlink Semi-Persistent Scheduling (DL SPS) assignment and a second DL SPS assignment from a network node. At least one resource associated with the first DL SPS assignment and at least one resource associated with the second DL SPS assignment are at least partially overlapping. The wireless device compares priority information associated with each of the first DL SPS assignment and the second DL SPS assignment and selects a one of the first DL SPS assignment and the second DL SPS assignment that has a higher priority based on the priority information. The wireless device attempts to decode the Physical Downlink Shared Channel (PDSCH) according to the selected one of the first DL SPS assignment and the second DL SPS assignment that has the higher priority.

According to certain embodiments, a wireless device includes processing circuitry configured to receive a first DL SPS assignment and a second DL SPS assignment from a network node. At least one resource associated with the first DL SPS assignment and at least one resource associated with the second DL SPS assignment are at least partially overlapping. The processing circuitry is configured to compare priority information associated with each of the first DL SPS assignment and the second DL SPS assignment and selects a one of the first DL SPS assignment and the second DL SPS assignment that has a higher priority based on the priority information. The processing circuitry is configured to attempt to decode the PDSCH according to the selected one of the first DL SPS assignment and the second DL SPS assignment that has the higher priority.

According to certain embodiments, a method by a base station includes granting a first DL SPS assignment and a second DL SPS assignment to a wireless device. At least one resource associated with the first DL SPS assignment and at least one resource associated with the second DL SPS assignment are at least partially overlapping. The base station transmits downlink (DL) data to the wireless device using only a one of the first DL SPS assignment and second DL SPS assignment that has a higher priority based on priority information associated with the first and second DL SPS assignments.

According to certain embodiments, a base station includes processing circuitry configured to grant a first DL SPS assignment and a second DL SPS assignment to a wireless device. At least one resource associated with the first DL SPS assignment and at least one resource associated with the second DL SPS assignment are at least partially overlapping. The processing circuitry is configured to transmit DL data to the wireless device using only a one of the first DL SPS assignment and second DL SPS assignment that has a higher priority based on priority information associated with the first and second DL SPS assignments.

Certain embodiments may provide one or more of the following technical advantages. For example, certain embodiments allow the wireless device to determine how to manage DL SPS configurations according to defined priority order. This may allow the network node such as, for example, the gNodeB (gNB), to rely on this prioritization. As a result, a trusted prioritization may occur without requiring additional processing and control signalling for dynamic assignments. In this manner, multiple downlink New Radio-Industrial Internet of Things (DL NR-IIOT) traffic flows can be more efficiently handled by the New Radio (NR) system.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 illustrates an example method by a wireless device, according to certain embodiments;

FIG. 15 illustrates another example method by a wireless device, according to certain embodiments;

FIG. 17 illustrates an example method by a network node, according to certain embodiments; and FIG. 18 illustrates another exemplary virtual computing device, according to certain embodiments.

DETAILED DESCRIPTION

Figure 1:
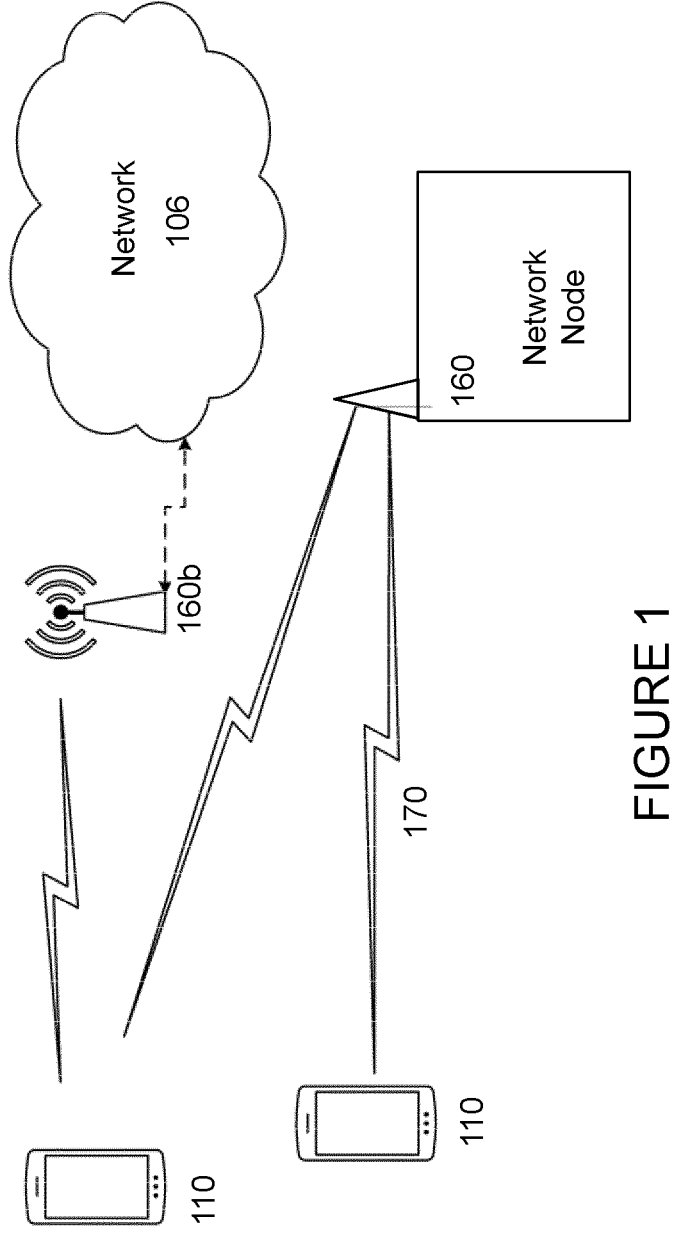
FIG. 1 illustrates an example wireless network, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Disclosed herein are several techniques and embodiments for handling overlapping resources associated with multiple downlink Semi-Persistent Scheduling (DL SPS) assignments provided to a wireless device such as, for example, a UE. While certain embodiments are described below, this disclosure further includes any suitable variation or combination of techniques and systems described herein that a person of ordinary skill in the art would recognized disclosed herein.

According to certain embodiments disclosed herein, methods and systems are provided for handling when radio resources provided by different DL SPS assignments to the same wireless device overlap. For example, in certain embodiments, the wireless device may consider the value of the configured index per configuration or the value of the configured Hybrid Automatic Repeat Request (HARQ) process identifier (ID) offset per configuration as an indicator of priority or the inverse of priority corresponding to a DL SPS assignment. Accordingly, the wireless device may consider the priority of the assignment to determine how to handle the case where different assignments provide overlapping radio resources. For example, the wireless device may only consider the DL SPS assignment of the highest priority as valid, according to certain embodiments.

Overlapping is not Allowed/Considered

According to certain embodiments, the overlapping case requiring prioritization can be disallowed in the UE. For example, in certain embodiments, a network node such as a gNodeB (gNB), knowing the DL SPS configurations it provided to the UE, knows the points in time when the radio resources corresponding to downlink (DL) assignments overlap. To avoid instances of radio resource overlapping between the DL SPS configurations, the gNB can issue a dynamic DL assignment that, according to the current New Radio (NR) specification, is always prioritized over any DL SPS assignment. Accordingly, the UE may not be required to make a decision to prioritize among the DL SPS assignments, as the dynamic DL assignment is always prioritized.

This approach may be limited. For example, this technique/configuration may require further processing by the gNB and additional dynamic signalling, even though the priority of which DL SPS configuration is to be prioritized is not necessarily dynamic (i.e., might be always the same). According to a particular embodiment, the dynamic downlink assignment sent may not specify different resources to be decoded but merely provide a priority indicator identifying which DL SPS assignment should be used for decoding. Stated differently, the priority indicator may indicate which DL SPS configuration is to be prioritized. Furthermore, the dynamic DL assignment may also be lost and, as such, not decodable by the UE, in which case the overlapping issue remains unsolved.

In the situation where the dynamic DL assignment is not decodable by the UE, according to certain embodiments, the UE resolves the overlapping issue by one or more of the embodiments described below. For example, if there is no overriding dynamic assignment (because the dynamic DL assignment was not decoded), then the UE may be required to process each of the DL SPS associated with the overlapping resources. In other embodiments, the UE may not be required to process the overlapping DL SPS, as if there is an overriding dynamic assignment.

Overlapping Handled by Selecting One Assignment According to a Priority

According to certain other embodiments, the UE may select one particular DL SPS assignment when there are two or more assignments associated with overlapping resources. For example, when considering two DL SPS assignments that have different periodicities such that the resources associated with two DL SPS assignments only occasionally overlap, then for these occasional overlaps the gNB may determine which DL SPS assignment the UE will prioritize (and therefore only sends the higher priority data using the higher priority DL SPS assignment). According to this situation, if the two DL SPS assignments have the same periodicities (but different priorities) and the resources associated with the two DL SPS assignments always overlap for each corresponding transmission, then the UE would effectively never attempt to receive the lower priority transmission (i.e., this would represent an invalid, released or suspended configuration for the lower priority DL SPS assignment).

The selection made by the UE should be carried out based on a certain priority associated with the DL SPS assignments. The priority may be derived from the configuration index;

the configuration's parameter HARQ process ID offset (note that this is currently only supported for LTE in SPS-Config field—see 36.331), where the index value is considered proportional/inverse proportional to the priority. The HARQ process ID currently has no priority implications as it is only considered to be used to define certain HARQ process pools (i.e. a valid set of HARQ Process Identifiers (PIDs) for each DL SPS configurations, and those can be separate, i.e. DL SPS configuration a would use HARQ processes 1 and 2, and DL SPS configuration b would use HARQ processes 3 and 4;

the transmission parameters in the activation DCI, with the principle that a higher priority is given to the transmission with higher reliability and shorter transmission duration, for example, the mini-slot transmission is given higher priority, QPSK is given higher priority than 16QAM, and lower coding rate is given higher priority, etc.; and/or other time-frequency resource or demodulation and decoding parameters may be utilized to determine the priority. For example, a DL SPS assignment of a shorter transmission duration, e.g. mini-slot duration may be prioritized over another DL SPS assignment of a longer transmission duration.

According to this DL SPS selection method, the UE may attempt decoding of PDSCH according to the selected DL SPS assignment. In this manner, the UE may select a prioritized DL SPS over an DL SPS based on information related to a priority of the DL SPS.

Overlapping Handled by Decoding Attempts of all SPS Assignments

According to certain other embodiments, the UE may attempt decoding the DL transmissions according to all DL SPS assignments, even if resources associated therewith overlap. For example, the UE may be configured with separate HARQ process pools for the DL SPS assignments. Accordingly, from the UE's point of view, multiple DL SPS assignments may not override each other's received data.

This UE capability would enable the gNB to flexibly utilize one of the previously assigned DL SPS configurations depending on data availability, for example. The gNB would simply perform discontinuous transmission (DTX), refraining from sending anything on a certain DL SPS configuration such as, for example, if there is no data available for transmission on this traffic flow for which this DL SPS configuration is intended. However, the gNB may be restricted to select one DL SPS configuration for data transmission when its corresponding radio resources overlap with those of one or more other DL SPS configurations.

According to certain embodiments, the gNB may intentionally associate multiple DL SPS configurations with recurring overlapping resources; however, the DL SPS configurations are differentiated such as, for example, in modulation coding scheme (MCS) or transport block size. According to which data becomes available in the gNB, e.g., based on the Quality of Service (QoS) requirements of the data, the gNB can choose and transmit according to the most appropriate DL SPS configuration. Dynamic PDCCH signalling may not be required in this case, thereby saving PDCCH resources, and the UE is not subject to PDCCH failures. Once again, the gNB may be restricted to selecting only one DL SPS for data transmission when its corresponding resources overlap with those of one or more other DL SPS configurations.

According to certain embodiments, the UE may support a set of simultaneous SPS assignments where a priority between assignments may be configured, or implicitly determined, such as by using a MCS table or similar. Simultaneous SPS assignments may include those having the same time domain and frequency domain resources. In some embodiments, the SPS assignments being simultaneous could also mean having the same DL Carrier Bandwidth Part (BWP) for where overlapping assignments would occur such as, for example, when handling when overlapping per time/frequency resource or overlapping handling applies per configuration as soon as any instance of assignments overlap. Herein, when it is stated that two DL SPS assignments overlap, it is recognized that it is actually the resources of the two DL SPS assignments that overlap.

Further, when another downlink assignment is decoded such as, for example, through the UE monitoring the DCI formats with CRC scrambled by a UE specific identity or identities and decoding another UE specific identity associated with a higher priority of a DL assignment, the UE may deactivate one or more lower (or the lowest priority) of active DL SPS assignments. By this, there may be savings in control signalling and resource reservation through, for example, PDCCH and HARQ signalling through released Physical Uplink Control Channel (PUCCH) resource configurations. Once again, the gNB may be restricted to selecting only one DL SPS assignment for data transmission when the corresponding resources of the DL SPS assignment overlap with those of one or more other DL SPS assignments.

Overlapping Handled by Specific DL SPS Configuration for Overlapping Occasions

According to certain other embodiments, a special DL SPS configuration is defined and activated for the UE, which is valid for reception only in overlapping occasions. For example, the special DL SPS configuration does not recur periodically except it occurs at overlapping occasions of other DLS SPS configuration. In some embodiments, a higher capacity transport block size may be used in this special DL SPS configuration, thereby allowing transmission of data that would have been taking place on each individual configuration. For example, the higher capacity transport block size may be the sum of both overlapping configurations, in a particular embodiment.

FIG. 1 illustrates an example wireless network, in accordance with some embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wide local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
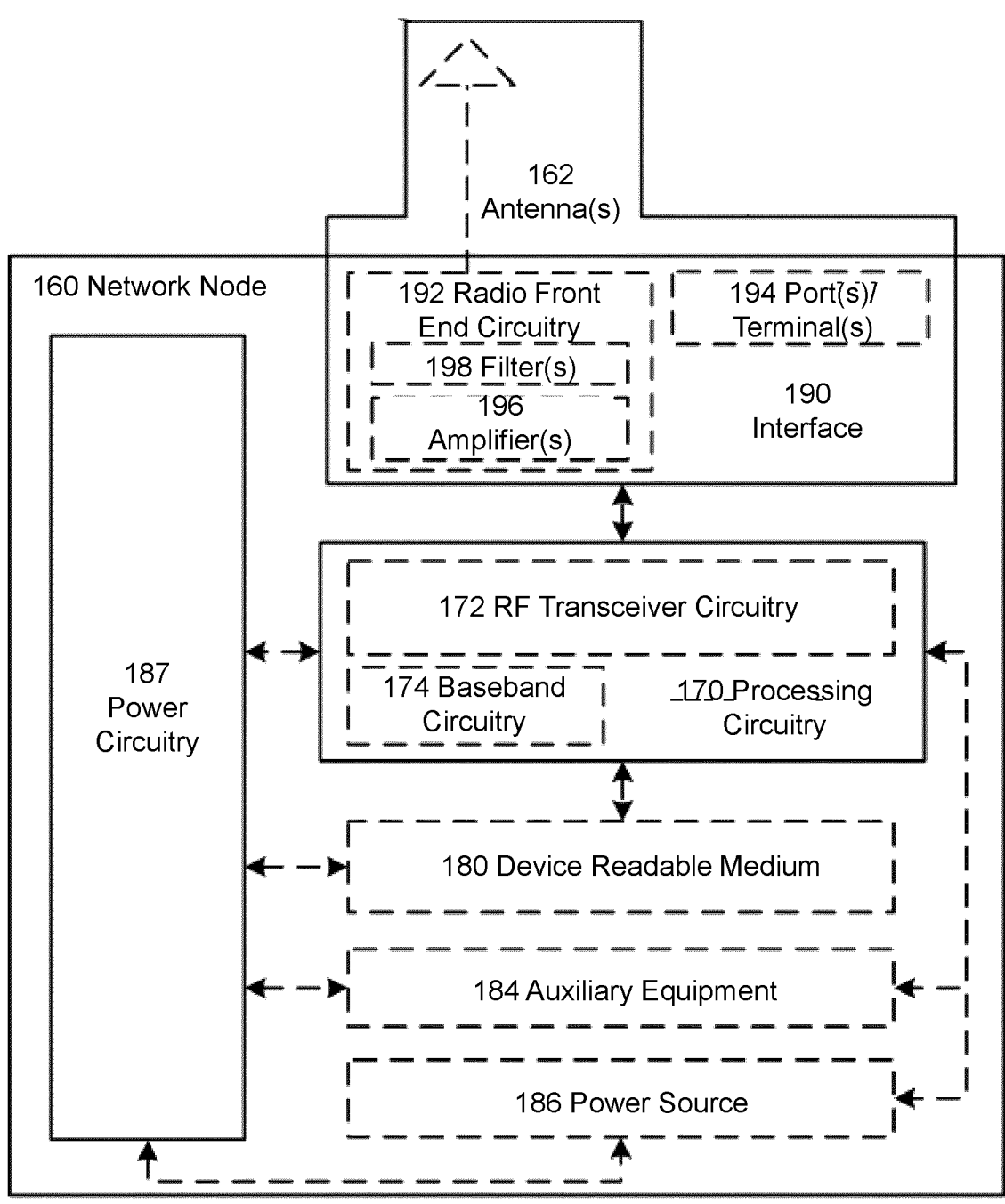
FIG. 2 illustrates an example network node, according to certain embodiments.

FIG. 2 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobile Management Entities (MMEs)), Operations and Maintenance (O&M) nodes, Operations Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
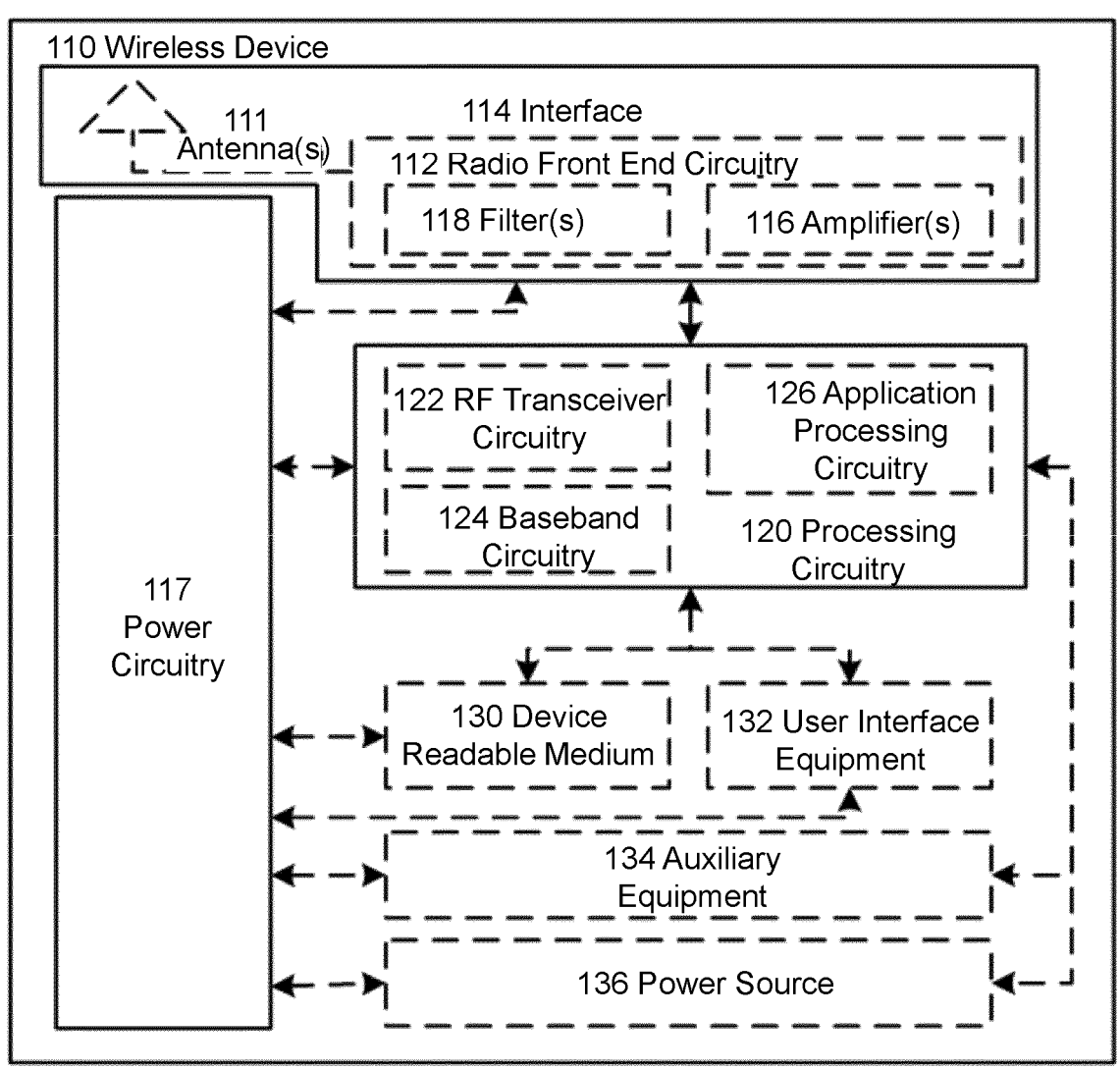
FIG. 3 illustrates an example wireless device, according to certain embodiments.

FIG. 3 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 4:
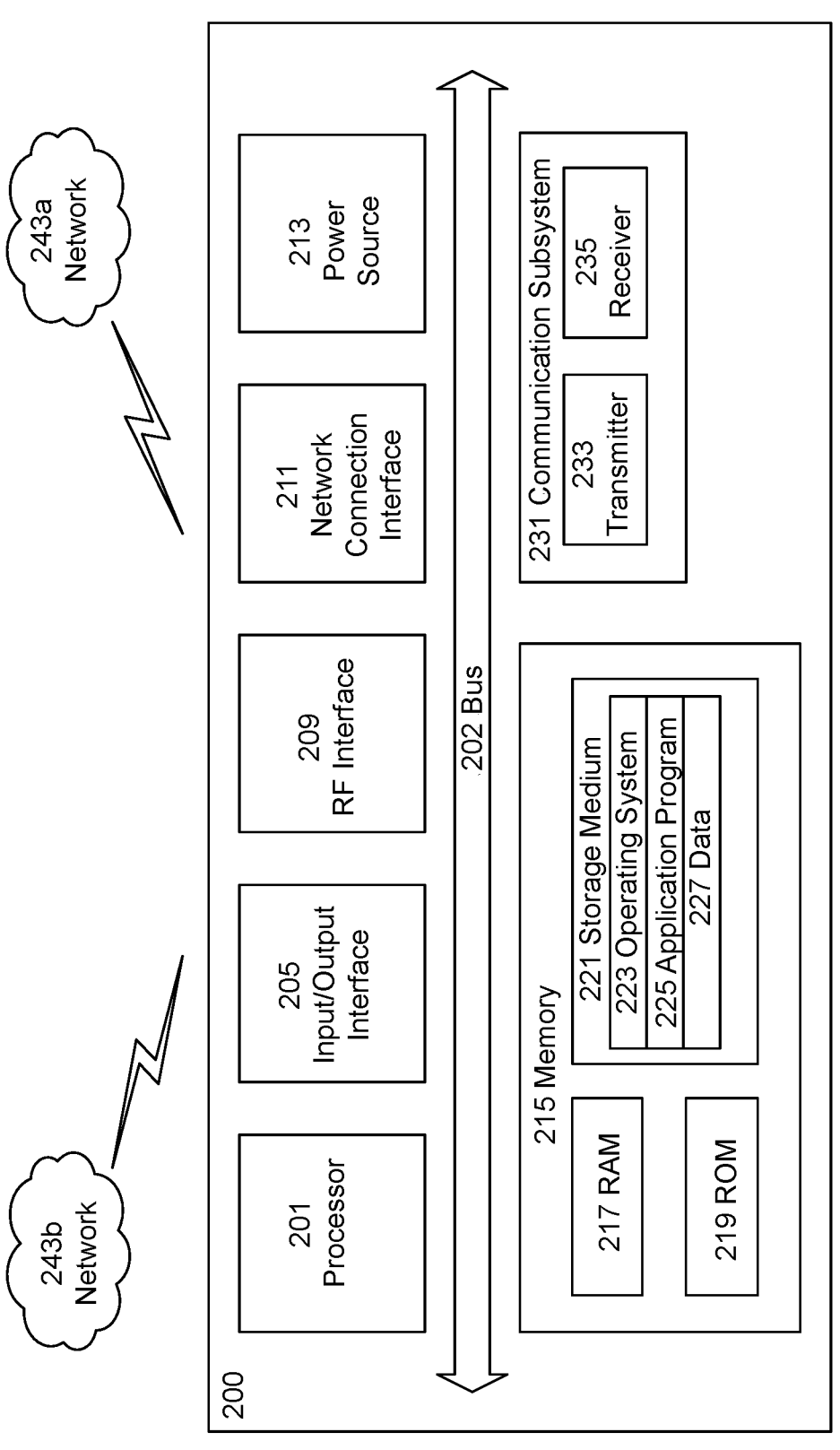
FIG. 4 illustrate an example user equipment, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 4 is a UE, the components discussed herein are equally applicable to a wireless device, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, Code Division Multiplexing Access (CDMA), Wide-CDMA (WCDMA), Global System for Mobile Communication (GSM), LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
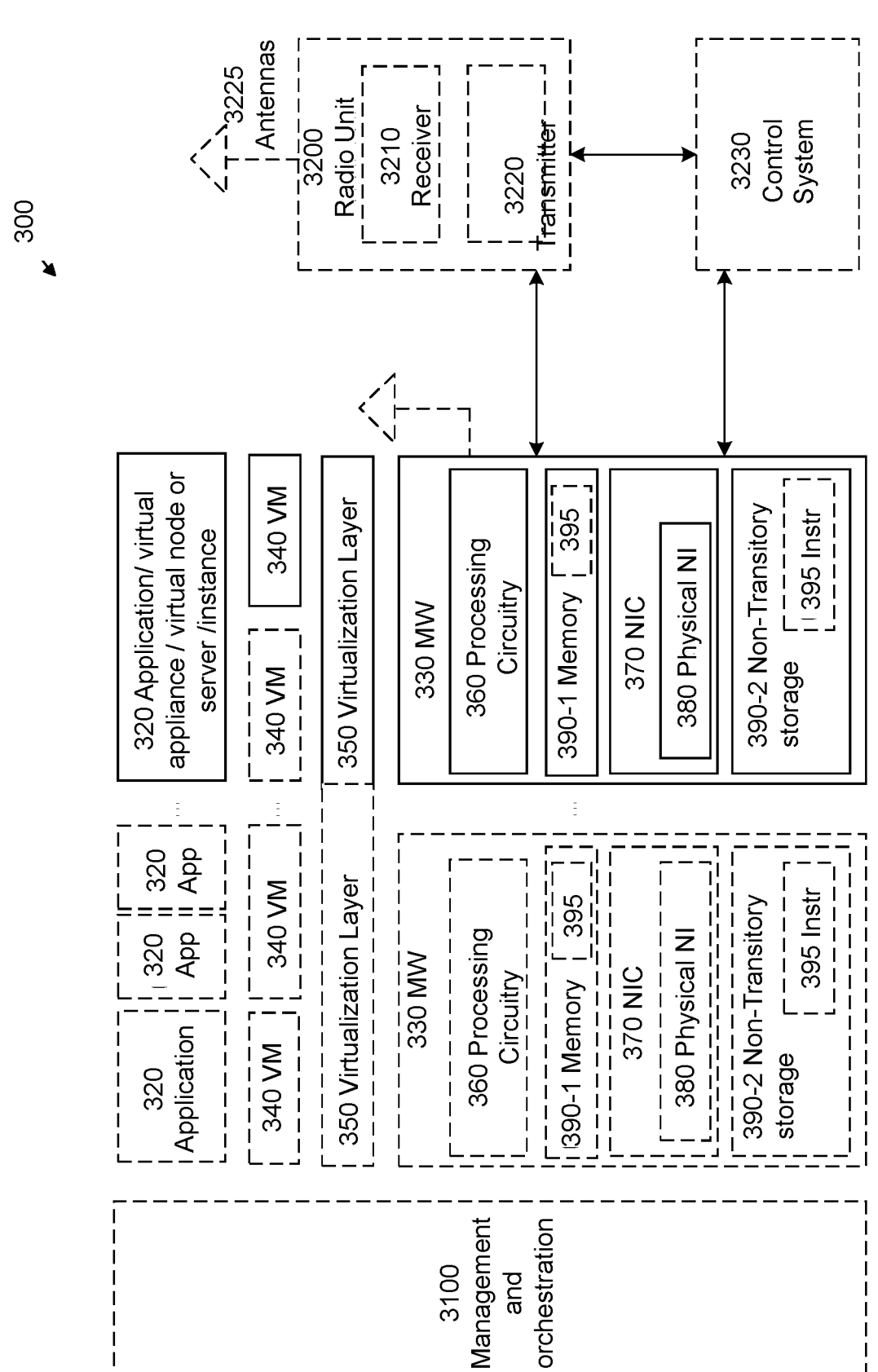
FIG. 5 illustrates a virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
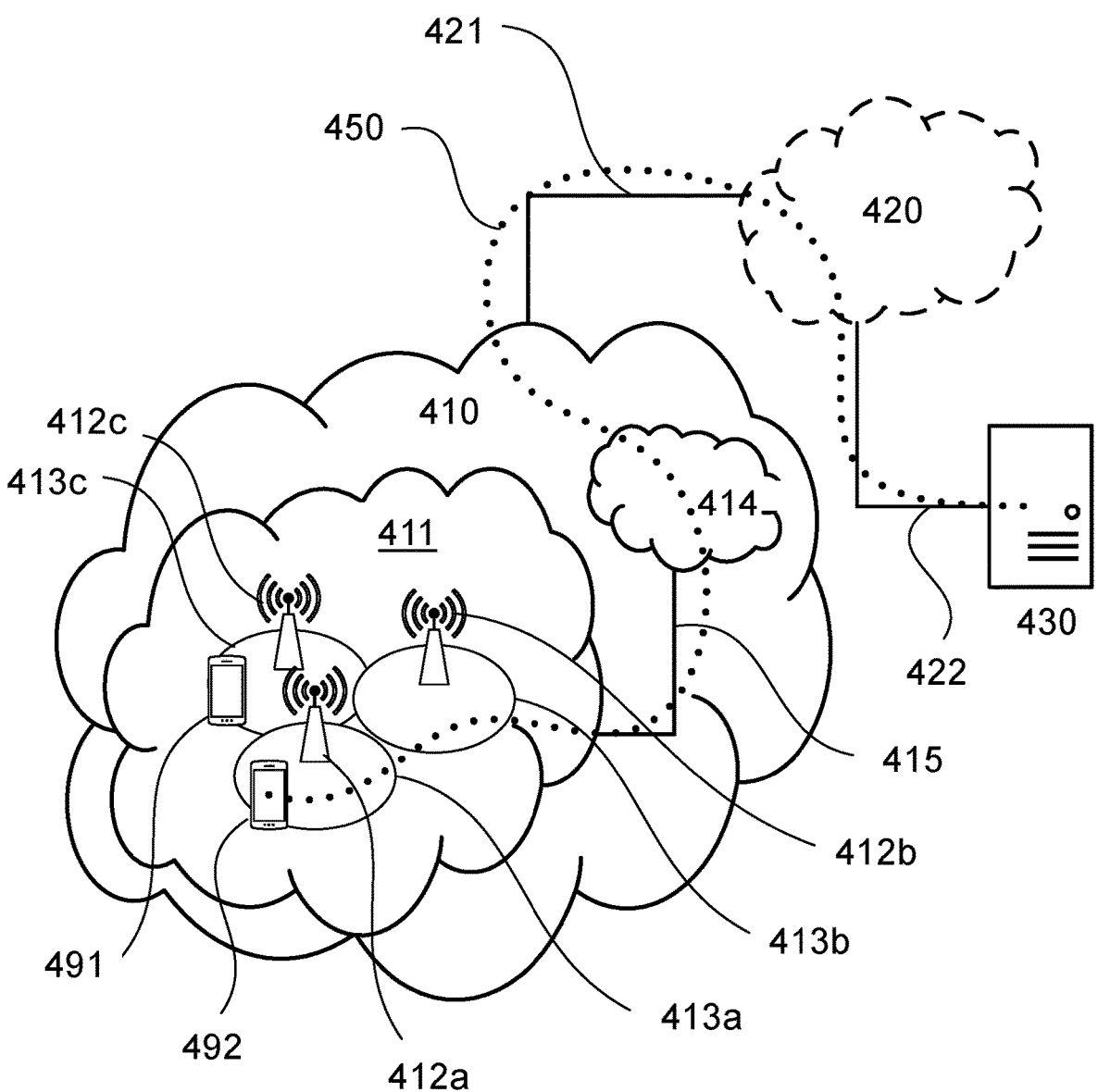
FIG. 6 illustrates a telecommunication network connected via an intermediate network to a host computer, according to certain embodiments.

FIG. 6 illustrates a telecommunication network connected via an intermediate network to a host computer, in accordance with some embodiments. In accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
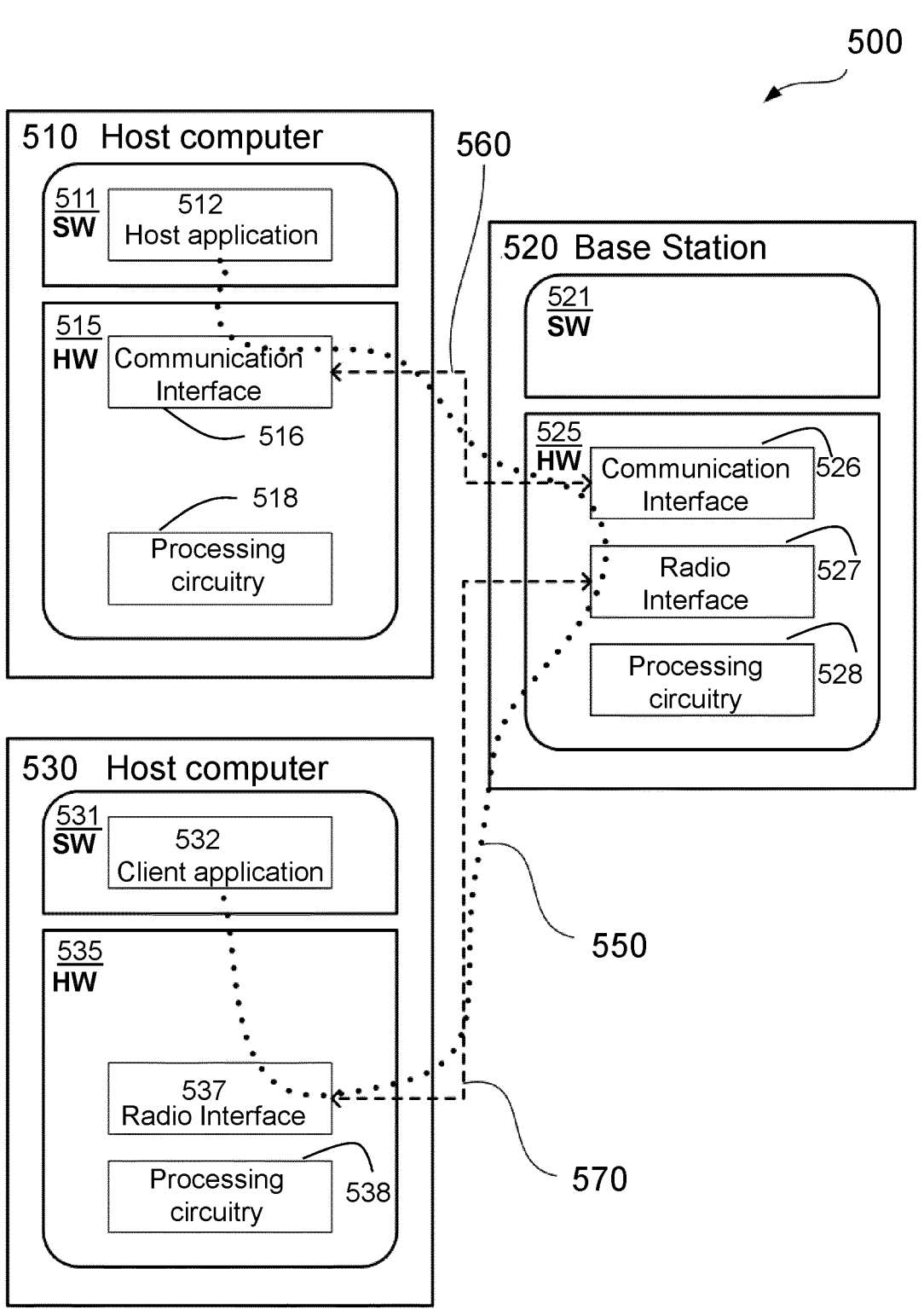
FIG. 7 illustrates a generalized block diagram of a host computer communicating via a base station with a user equipment over a partially wireless connection, according to certain embodiments.

FIG. 7 illustrates a host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412*a*, 412*b*, 412*c* and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate and reduce latency and thereby provide benefits such as reduced waiting time, released restriction on file size, and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 8, 9:
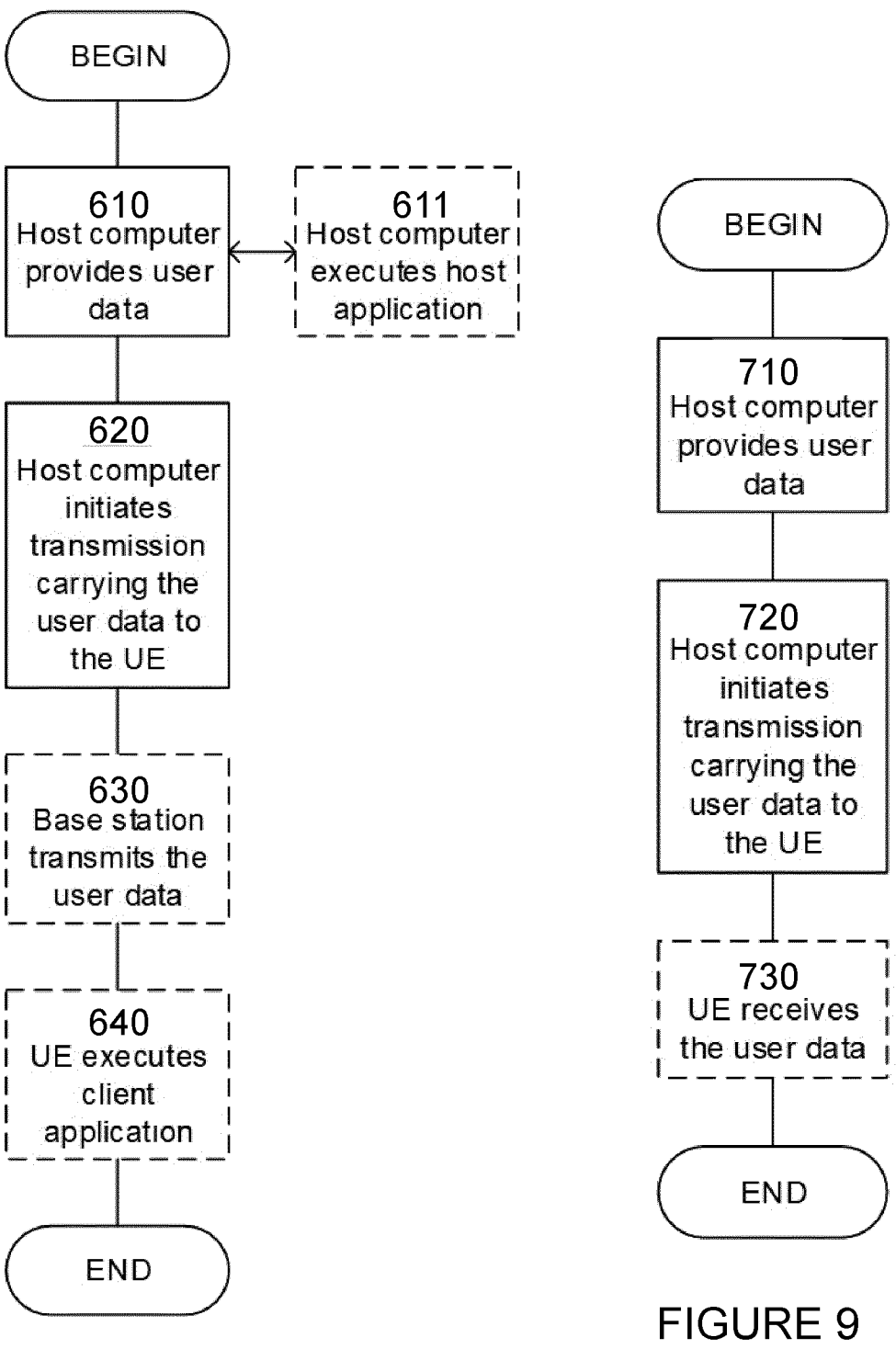
FIG. 8 illustrates a method implemented in a communication system, according to one embodiment.
FIG. 9 illustrates another method implemented in a communication system, according to one embodiment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 10, 11:
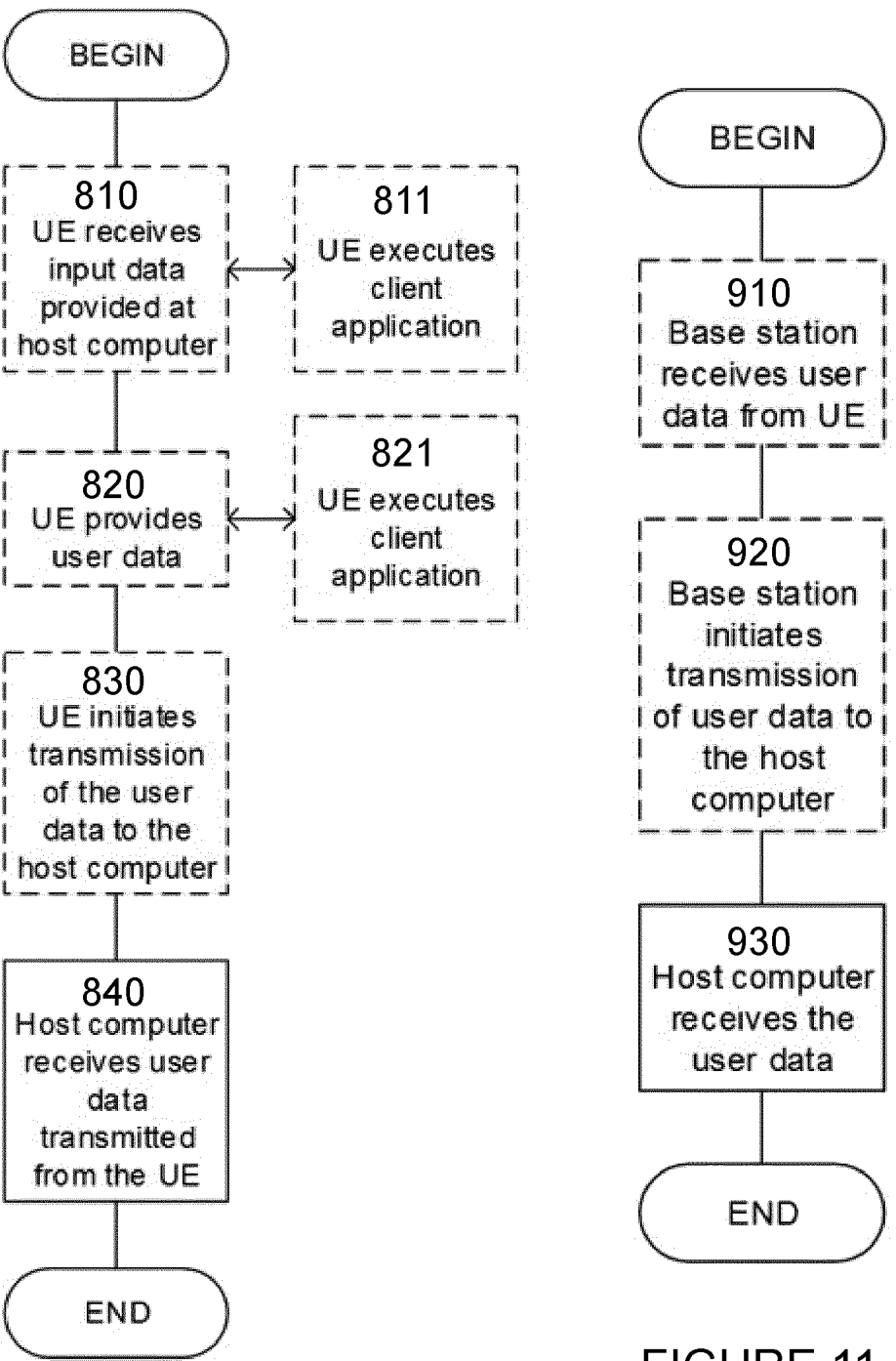
FIG. 10 illustrates another method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 12 depicts an example method by a wireless device 110, according to certain embodiments. The method begins at step 1002 with receiving a first DL SPS assignment and a second DL SPS assignment from a network node. For example, a wireless device 110 may receive multiple DL SPS assignments for different streams of data. In certain embodiments, the first and second DL SPS assignments provide radio resources that are at least partially overlapping. For example, the radio resource provided by the assignments may overlap in time and/or frequency on one or more occasions. In particular, the first DL SPS assignment may provide radio resources that have a periodicity of p (e.g., resources available every p time intervals) and the second DL SPS assignment may provide radio resources that have a periodicity of p' different from p. Depending on the offset and the least common multiple of the periodicities p and p', there will be a certain number of time intervals for which the radio resources provided by the assignments overlap. In some embodiments, the radio resources provided by the assignments completely overlap, e.g., same starting interval and same periodicity.

At step 1004, priority information associated with each of the first DL SPS assignment and the second DL SPS assignment is compared. For example, as discussed above, this priority information may indicate a priority of the DL SPS assignment. In some embodiments, the priority information is based on or associated with one or more of the index of the configuration of the DL SPS assignment, the HARQ process ID offset of the configuration of the DL SPS assignment; transmission parameters in the activation downlink control information including reliability parameters and transmission duration; and/or time-frequency resource or demodulation and decoding parameters. In another embodiment, the priority information may simply be a priority indicator received from the network node that indicates the relative priority of the DL SPS assignments, e.g., the later assigned DL SPS has a higher or lower priority than the previously assigned DL SPS. The wireless device may use the priority information to determine which DL SPS assignment has the higher priority.

At step 1006, the DL SPS assignment of the first DL SPS assignment and the second DL SPS assignment that has the higher priority is selected. For example, the first DL SPS assignment may be selected because it has a shorter transmission duration and uses QPSK instead of 16QAM. Based on the selection, at step 1008, the wireless device may attempt to decode the Physical Downlink Shared Channel (PDSCH) according to the selected DL SPS assignment. For example, the wireless device may ignore the unselected DL SPS assignment and only attempt decoding on the selected assignment. The network node sending the DL data may also make a parallel determination and only transmit data on the assignment that the wireless device will prioritize. In this manner, the wireless device may determine how to receive DL data when configured with overlapping radio resources corresponding to different DL SPS assignments.

Figure 13:
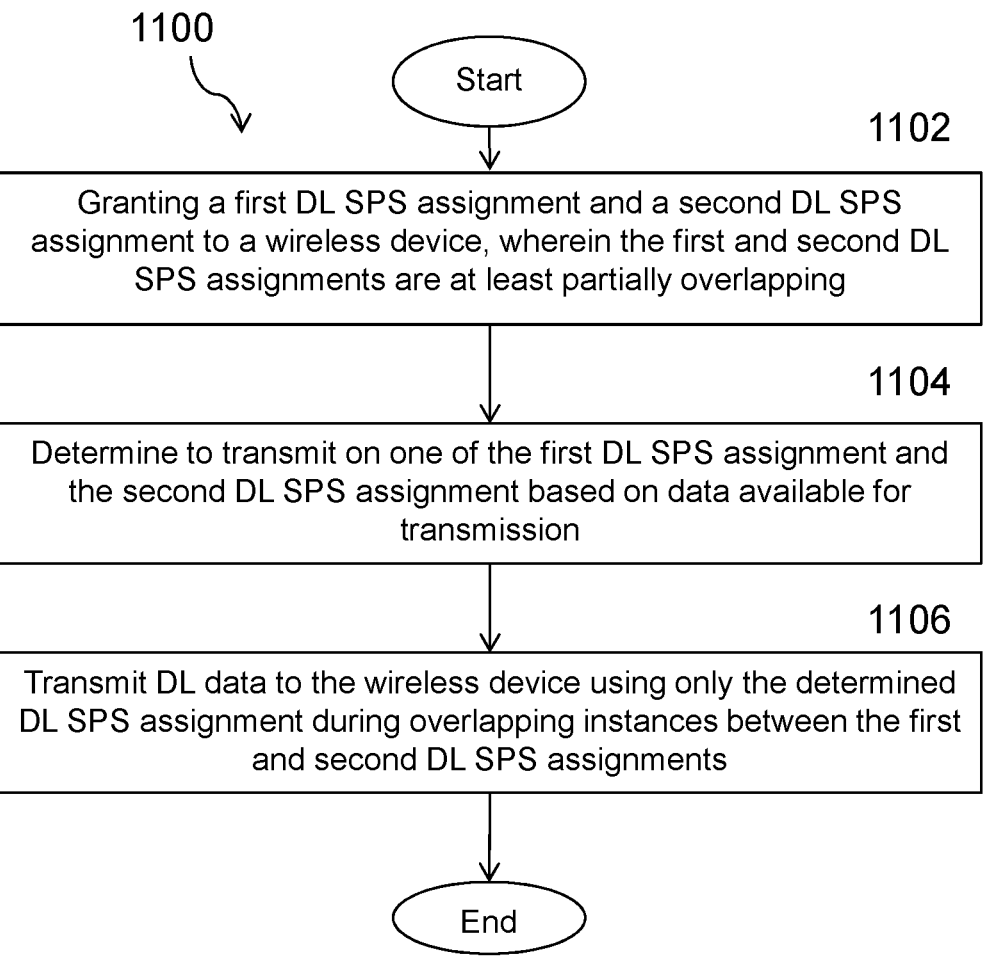
FIG. 13 illustrates an example method by a network node, according to certain embodiments.

FIG. 13 depicts an example method by a network node 160 such as a base station, according to certain embodiments. The method begins at step 1102 with granting a first DL SPS assignment and a second DL SPS assignment to a wireless device. For example, a network node may grant the first and second DL SPS assignments which provide radio resources that are at least partially overlapping to accommodate multiple data streams. At 1104, the network node may determine to transmit on one of the first and second DL SPS assignments based on the data available for transmission. For example, the network node may only transmit on the DL SPS assignments when there is data available according to that configuration. Further, during overlapping instances of radio resources corresponding to the DL SPS assignments, the network node may be configured to only transmit on one of the DL SPS assignments. This reduces the amount of wasted signalling resources since only one DL assignment may be decoded by the wireless device. In this case, the network node may select the DL SPS assignment corresponding to the more important or prioritized data or the assignment that may accommodate the size or Quality of Service (QoS) requirements of the pending data. Further, the assignment may be selected based on which assignment can accommodate the most data. In this manner, the network node may determine one of the overlapping assignments to use in transmitting data.

At step 1106, the network node transmits DL data to the wireless device using only the determined DL SPS assignment during overlapping radio resource instances between the first and second DL SPS assignments. For example, the network node may refrain from transmitting DL data on one of the DL SPS assignments to avoid signalling data when it is not likely to be decoded by the wireless device. Furthermore, this may allow the wireless device to not have to determine which DL SPS assignment to prioritize during overlapping radio resource instances, e.g., the wireless device can attempt to decode all SPS assignments. In this manner, the network node may facilitate the efficient DL signalling even when there are DL SPS assignments having overlapping radio resources.

Figure 14:
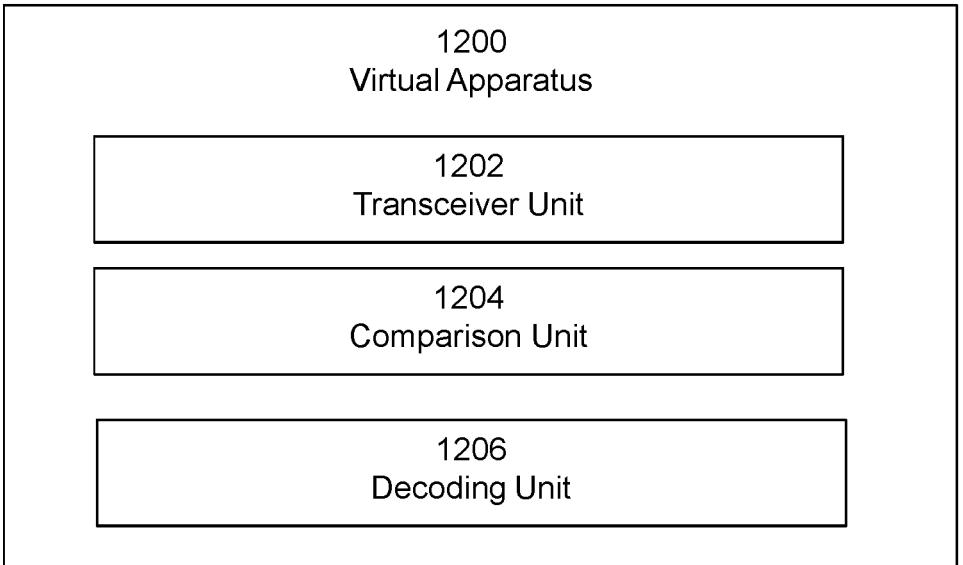
FIG. 14 illustrates an exemplary virtual computing device, according to certain embodiments.

FIG. 14 illustrates a schematic block diagram of an apparatus 1200 in a wireless network (for example, the wireless network shown in FIG. 1). The apparatus may be implemented in a wireless device or network node (e.g., wireless device 110 or network node 160 shown in FIG. 1). Apparatus 1200 is operable to carry out the example method described with reference to FIG. 13 and possibly any other processes or methods disclosed herein. It is also to be understood that the method of FIG. 13 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transceiver unit 1202, comparison unit 1204, decoding unit 1206, and any other suitable units of apparatus 1200 to perform corresponding functions according one or more embodiments of the present disclosure.

As illustrated in FIG. 14, apparatus 1200 includes transceiver unit 1202, comparison unit 1204, and decoding unit 1206. Transceiver unit 1202 is configured to receive a first DL SPS assignment and a second DL SPS assignment from a network node. For example, Transceiver unit 1202 may receive multiple DL SPS assignments for different streams of data. In certain embodiments, the first and second DL SPS assignments provide radio resources that are at least partially overlapping. For example, the assignments may overlap in time and/or frequency on one or more occasions. In some embodiments, the assignments completely overlap, e.g., same starting interval and same periodicity.

Comparison unit 1204 is configured to compare priority information associated with each of the first DL SPS assignment and the second DL SPS assignment. For example, as discussed above, this priority information may indicate a priority of the DL SPS assignment. Comparison unit 1204 may compare the priority information to determine which DL SPS assignment has the higher priority. Comparison unit 1204 may be further configured to select the DL SPS assignment of the first DL SPS assignment and the second DL SPS assignment that has the higher priority. For example, the first DL SPS assignment may be selected because it has a shorter transmission duration and uses QPSK instead of 16QAM.

Decoding unit 1206 may, based on the selection, attempt to decode the PDSCH according to the selected DL SPS assignment. For example, decoding unit 1206 may ignore the unselected DL SPS assignment and only attempt decoding on the selected assignment. A network node serving the DL data may also make a parallel determination and only transmit data on the assignment that the virtual apparatus 1200 will prioritize. In this manner, the virtual apparatus 1200 may determine how to receive DL data when configured with DL SPS assignments proving overlapping radio resources.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

FIG. 15 depicts an example method performed by a wireless device 110, according to certain embodiments. The method begins at step 1302 when the wireless device 110 receives a first DL SPS assignment and a second DL SPS assignment from a network node 160. At least one resource associated with the first DL SPS assignment and at least one resource associated with the second DL SPS assignment are at least partially overlapping. At step 1304, the wireless device 110 compares priority information associated with each of the first DL SPS assignment and the second DL SPS assignment. The wireless device 110 selects a one of the first DL SPS assignment and the second DL SPS assignment that has a higher priority based on the priority information, at step 1306. At step 1308, the wireless device 110 attempts to decode the PDSCH according to the selected one of the first DL SPS assignment and the second DL SPS assignment that has the higher priority.

According to a particular embodiment, the priority information includes a first SPS configuration index associated with the first DL SPS assignment and a second SPS configuration index associated with the second DL SPS assignment. According to a further particular embodiment, the priority information includes receiving priority indicators from the network node. According to another particular embodiment, the priority indicators are received in DCI.

According to a particular embodiment, the priority information includes information associated with at least one of:

a HARQ ID offset of a configuration of the first DL SPS assignment and a HARQ ID offset of a configuration of the second DL SPS assignment;

transmission parameters in the activation DCI the transmission parameters comprising reliability parameters and transmission duration; and time-frequency resource or demodulation and decoding parameters.

According to a particular embodiment, the wireless device 110 is configured with separate HARQ process pools for the first and second DL SPS assignments.

According to a particular embodiment, wireless device 110 obtains a third DL SPS assignment from the network node and deactivates the first DL SPS assignment and the second DL SPS assignment for all occasions wherein the at least one resource associated with the first DL SPS assignment and the at least one resource associated with the second DL SPS assignment overlaps. Wireless device 110 uses only the third DL SPS assignment for all occasions when the at least one resource associated with the first DL SPS assignment and the at least one resource associated with the second DL SPS assignment overlaps.

According to a further particular embodiment, the third DL SPS assignment includes a transport block size that is equal to or greater than a transport block size of the first DL SPS assignment and the second DL SPS assignment.

According to a particular embodiment, the at least one resource associated with the first DL SPS assignment and the at least one resource associated with the second DL SPS assignment are at least partially overlapping when the at least one resource associated with the first DL SPS assignment and the at least one resource associated with the second DL SPS assignment overlap in a frequency domain, a time domain, or both the frequency and time domains.

According to a particular embodiment, at least one resource associated with the first DL SPS assignment and the at least one resource associated with the second DL SPS assignment are at least partially overlapping when there are one or more points in time when the at least one resource associated with the first DL SPS assignment and the at least one resource associated with the second DL SPS assignment overlap.

According to a particular embodiment, the wireless device 110 receives a dynamic DL assignment from the network node and prioritizes the dynamic DL assignment in a further overlapping instance of the at least one resource associated with the first DL SPS assignment and the at least one resource associated with the second DL SPS assignment.

Figure 16:
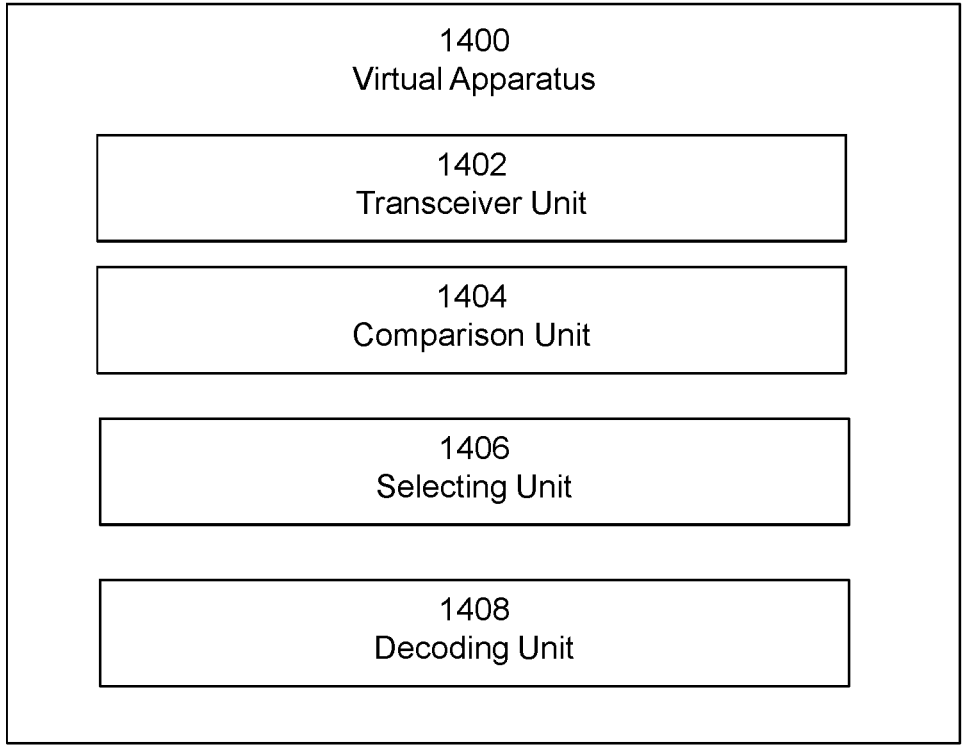
FIG. 16 illustrates another exemplary virtual computing device, according to certain embodiments.

FIG. 16 illustrates a schematic block diagram of an apparatus 1400 in a wireless network (for example, the wireless network shown in FIG. 1). The apparatus may be implemented in a wireless device or network node (e.g., wireless device 110 or network node 160 shown in FIG. 1). Apparatus 1400 is operable to carry out the example method described with reference to FIG. 15 and possibly any other processes or methods disclosed herein. It is also to be understood that the method of FIG. 15 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transceiver unit 1402, comparison unit 1404, selecting unit 1406, decoding unit 1408, and any other suitable units of apparatus 1400 to perform corresponding functions according one or more embodiments of the present disclosure.

As illustrated in FIG. 16, apparatus 1400 includes transceiver unit 1402, comparison unit 1404, selecting unit 1406, and decoding unit 1408. Transceiver unit 1402 is configured to receive a first DL SPS assignment and a second DL SPS assignment from a network node. For example, transceiver unit 1402 may receive multiple DL SPS assignments for different streams of data. In certain embodiments, at least one resource associated with the first DL SPS assignment and at least one resource associated with the second DL SPS assignment are at least partially overlapping. For example, the assignments may overlap in time and/or frequency on one or more occasions. In some embodiments, the assignments completely overlap, e.g., same starting interval and same periodicity.

Comparison unit 1404 is configured to compare priority information associated with each of the first DL SPS assignment and the second DL SPS assignment. For example, as discussed above, this priority information may indicate a priority of the DL SPS assignment. Comparison unit 1204 may compare the priority information to determine which DL SPS assignment has the higher priority.

Selecting unit 1406 is configured to select a one of the first DL SPS assignment and the second DL SPS assignment that has a higher priority based on the priority information.

Decoding unit 1408 may, based on the selection, attempt to decode the PDSCH according to the one of the first DL SPS assignment and the second DL SPS assignment that was selected as having the higher priority. For example, decoding unit 1408 may ignore the unselected DL SPS assignment and only attempt decoding on the selected assignment. A network node serving the DL data may also make a parallel determination and only transmit data on the DL SPS assignment that the virtual apparatus 1400 will prioritize. In this manner, the virtual apparatus 1400 may determine how to receive DL data when configured with overlapping DL SPS assignments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

FIG. 17 depicts an example method performed by a network node 160 such 160 such as a base station, according to certain embodiments. The method begins at step 1502 when the network node 160 grants a first DL SPS assignment and a second DL SPS assignment to a wireless device 110. At least one resource associated with the first DL SPS assignment and at least one resource associated with the second DL SPS assignment are at least partially overlapping. At step 1504, network node 160 transmits DL data to the wireless device using only a one of the first DL SPS assignment and second DL SPS assignment that has a higher priority based on priority information associated with the first and second DL SPS assignments.

In a particular embodiment, the priority information includes a first SPS configuration index associated with the first DL SPS assignment and a second DL SPS configuration index associated with the second DL SPS assignment.

In a particular embodiment, the network node 160 transmits the priority information to the wireless device 110, and the priority information includes priority indicators indicating the one of the first DL SPS assignment and the second DL SPS assignment to prioritize. In a particular embodiment, the priority indicators are transmitted in DCI.

In a particular embodiment, the priority information includes information associated with at least one of:

a HARQ ID offset of a configuration of the first DL SPS assignment and a HARQ ID offset of a configuration of the second DL SPS assignment;

transmission parameters in the activation DCI, the transmission parameters comprising reliability parameters and transmission duration; and time-frequency resource or demodulation and decoding parameters.

In a particular embodiment, the network node 160 transmits, to the wireless device 110, a third DL SPS assignment for prioritizing over the first and second DL SPS assignments for all occasions when the at least one resource associated with the first DL SPS assignment and the at least one resource associated with the second DL SPS assignment overlap. The network node 160 uses only the third DL SPS assignment for all occasions when the at least one resource associated with the first DL SPS assignment and the at least one resource associated with the second DL SPS assignment overlap.

In a particular embodiment, the third DL SPS assignment includes a transport block size that is equal to or greater than a transport block size of the first DL SPS assignment and the second DL SPS assignment.

In a particular embodiment, the at least one resource associated with the first DL SPS assignment and the at least one resource associated with the second DL SPS assignment at least partially overlap in a frequency domain, a time domain, or both the frequency and time domain.

In a particular embodiment, the at least one resource associated with the first DL SPS assignment and the at least one resource associated with the second DL SPS assignment at least partially overlap when there are one or more points in time when the first and second DL SPS assignments overlap.

In a particular embodiment, the network node 160 transmits a dynamic DL assignment to the wireless device for prioritization over the first and second DL SPS assignments during at least one further instance when the at least one resource associated with the first DL SPS assignment and the at least one resource associated with the second DL SPS assignment overlap.

In a particular embodiment, the first and second DL SPS configurations are different based on at least one of a modulation coding scheme and a transport size, and determining to transmit on the one of the first DL SPS assignment and the second DL SPS is further based on a comparison of the at least one of the modulation coding scheme and the transport size and a requirement of the data available for transmission.

In a particular embodiment, the network node 160 grants a fourth DL SPS assignment, and the fourth DL SPS assignment includes a transport block size that is equal to or greater than transport block sizes of the first and second DL SPS assignments and transmits downlink, DL, data to the wireless device using only the fourth DL SPS assignment for all occasions when the at least one resource associated with the first DL SPS assignment and the at least one resource associated with the second DL SPS assignment overlap.

In a particular embodiment, the priority information comprises a priority indicator identifying the one of the first and second DL SPS assignments to prioritize by the wireless device for decoding.

FIG. 18 illustrates a schematic block diagram of an apparatus 1600 in a wireless network (for example, the wireless network shown in FIG. 1). The apparatus may be implemented in a wireless device or network node (e.g., wireless device 110 or network node 160 shown in FIG. 1). Apparatus 1600 is operable to carry out the example method described with reference to FIG. 17 and possibly any other processes or methods disclosed herein. It is also to be understood that the method of FIG. 17 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause granting unit 1602, transceiver unit 1604, and any other suitable units of apparatus 1600 to perform corresponding functions according one or more embodiments of the present disclosure.

As illustrated in FIG. 18, apparatus 1600 includes granting unit 1602 and transceiver unit 1604. Granting unit 1602 is configured to grant a first DL SPS assignment and a second DL SPS assignment to wireless device 110. At least one resource associated with the first DL SPS assignment and at least one resource associated with the second DL SPS assignment are at least partially overlapping. In certain embodiments, the first and second DL SPS assignments are at least partially overlapping. For example, the assignments may overlap in time and/or frequency on one or more occasions. In some embodiments, the assignments completely overlap, e.g., same starting interval and same periodicity.

Transceiver unit 1604 is configured to transmit DL data to the wireless device 110 using only one of the first DL SPS assignment and the second DL assignment. For example, transceiver unit 1604 may transmit the DL assignment that has a higher priority based on priority information associated with the first and second DL SPS assignments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

1. A method performed by a wireless device, the method comprising: receiving a first DL SPS assignment and a second DL SPS assignment from a network node, wherein the first and second DL SPS assignments are at least partially overlapping; comparing priority information associated with each of the first DL SPS assignment and the second DL SPS assignment; selecting the DL SPS assignment of the first DL SPS assignment and the second DL SPS assignment that has the higher priority; and attempting to decode the Physical Downlink Shared Channel (PDSCH) according to the selected DL SPS assignment when the assignments are overlapping.

2. The method of the previous embodiment, wherein the priority information is associated with one or more of the index of the configuration of the DL SPS assignment, the HARQ process ID offset of the configuration of the DL SPS assignment; transmission parameters in the activation downlink control information including reliability parameters and transmission duration; and/or time-frequency resource or demodulation and decoding parameters.

2B. The method of any of the previous embodiments, wherein the priority information is a priority indication(s) received from the network node, wherein the priority indication(s) indicate which DL SPS assignment to prioritize over the other(s).

3. A method performed by a wireless device, the method comprising: receiving a first DL SPS assignment and a second DL SPS assignment from a network node, wherein the first and second DL SPS assignments are at least partially overlapping; and attempting to decode DL transmissions according to both the first and second DL SPS assignments.

4. The method of any of the previous embodiments, wherein the wireless device is configured with separate HARQ process pools for the first and second DL SPS assignments.

5. The method of any of the previous embodiments, wherein the first and second DL SPS assignments are completely overlapping and the method further comprises: receiving a third DL SPS assignment from the network node; and deactivating the DL SPS assignment of the first and second DL SPS assignments that has a lower priority.

6. The method of any of the previous embodiments, wherein the first and second DL SPS assignments are at least partially overlapping if the DL SPS assignments overlap in the frequency domain, time domain, or both the frequency and time domains.

7. The method of any of the previous embodiments, wherein the first and second DL SPS assignments are at least partially overlapping if there are one or more points in time where the DL assignments from the first and second DL SPS assignments overlap.

8. The method of any of the previous embodiments, further comprising: receiving a dynamic DL assignment from the network node; and prioritizing the dynamic DL assignment in any overlapping instance with any DL SPS assignments.

9. The method of any of the previous embodiments, further comprising: receiving a fourth DL SPS assignment; and using only the fourth DL SPS assignment only during overlapping occasions between the first and second DL SPS assignments.

10. The method of embodiment 9, wherein the fourth DL SPS assignment includes a transport block size that is equal to or greater than the transport block sizes of the first and second SPS assignments.

11. The method of any of the previous embodiments, further comprising: providing user data; and forwarding the user data to a host computer via the transmission to the base station.

12. A method performed by a base station, the method comprising: granting a first DL SPS assignment and a second DL SPS assignment to a wireless device, wherein the first and second DL SPS assignments are at least partially overlapping; determining which of the first DL SPS assignment and the second DL SPS assignment the wireless device will prioritize; transmitting DL data to the wireless device using only the DL SPS assignment determined to be prioritized by the wireless device during overlapping instances between the first and second DL SPS assignments.

13. The method of the previous embodiment, determining which of the first DL SPS assignment and the second DL SPS assignment the wireless device will prioritize is based on a comparison of priority information associated with the DL SPS assignments, wherein the priority information is associated with one or more of the index of the configuration of the DL SPS assignment, the HARQ process ID offset of the configuration of the DL SPS assignment; transmission parameters in the activation downlink control information including reliability parameters and transmission duration; and/or time-frequency resource or demodulation and decoding parameters.

14. A method performed by a wireless device, the method comprising: granting a first DL SPS assignment and a second DL SPS assignment to a wireless device, wherein the first and second DL SPS assignments are at least partially overlapping; determining to transmit on one of the first DL SPS assignment and the second DL SPS based on data available for transmission; transmitting DL data to the wireless device using only the determined DL SPS assignment during overlapping instances between the first and second DL SPS assignments.

15. The method of the previous embodiment, further comprising: refraining from transmitting on one or more of the first and second DL SPS assignments if there is no data available for transmission for the DL SPS assignment(s).

16. The method of any of the previous embodiments, wherein: the first and second DL SPS configurations are different based on a modulation coding scheme and/or transport size; and determining to transmit on one of the first DL SPS assignment and the second DL SPS is further based on a comparison of the modulation coding scheme and/or transport size and the requirements of the data available for transmission.

17. The method of any of the previous embodiments, wherein the first and second DL SPS assignments are completely overlapping and the method further comprises: granting a third DL SPS assignment to the wireless device; and receiving a deactivation indication indicating the deactivation of a DL SPS assignment of the first and second DL SPS assignments that has a lower priority.

18. The method of any of the previous embodiments, wherein the first and second DL SPS assignments are at least partially overlapping if the DL SPS assignments overlap in the frequency domain, time domain, or both the frequency and time domains.

19. The method of any of the previous embodiments, wherein the first and second DL SPS assignments are at least partially overlapping if there are one or more points in time where the DL assignments from the first and second DL SPS assignments overlap.

20. The method of any of the previous embodiments, further comprising: granting a dynamic DL assignment from the network node; and transmitting DL data to the wireless device using only the dynamic DL assignment in any overlapping instance with any DL SPS assignments.

21. The method of any of the previous embodiments, further comprising: granting a fourth DL SPS assignment; and transmitting DL data to the wireless device using only the fourth DL SPS assignment only during overlapping occasions between the first and second DL SPS assignments.

22. The method of embodiment 21, wherein the fourth DL SPS assignment includes a transport block size that is equal to or greater than the transport block sizes of the first and second SPS assignments.

23. The method of any of the previous embodiments, further comprising: providing a priority indicator identifying which DL SPS should be prioritized by the wireless device for decoding.

24. The method of any of the previous embodiments, further comprising: obtaining user data; and forwarding the user data to a host computer or a wireless device.

25. A wireless device, the wireless device comprising: processing circuitry configured to perform any of the steps of any of embodiments 1 to 11; and power supply circuitry configured to supply power to the wireless device.

26. A base station, the base station comprising: processing circuitry configured to perform any of the steps of any of embodiments 12 to 24; power supply circuitry configured to supply power to the base station.

27. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1 to 11; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

28. A computer program, the computer program comprising instructions which when executed on a computer perform any of the steps of any of embodiments 1 to 11.

29. A computer program product comprising a computer program, the computer program comprising instructions which when executed on a computer perform any of the steps of any of embodiments 1 to 11.

30. A non-transitory computer-readable storage medium or carrier comprising a computer program, the computer program comprising instructions which when executed on a computer perform any of the steps of any of embodiments 1 to 11.

31. A computer program, the computer program comprising instructions which when executed on a computer perform any of the steps of any of embodiments 12 to 24.

32. A computer program product comprising a computer program, the computer program comprising instructions which when executed on a computer perform any of the steps of any of embodiments 12 to 24.

33. A non-transitory computer-readable storage medium or carrier comprising a computer program, the computer program comprising instructions which when executed on a computer perform any of the steps of any of embodiments 12 to 24.

34. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of embodiments 12 to 24.

35. The communication system of the pervious embodiment further including the base station.

36. The communication system of the previous 2 embodiments, further including the UE, wherein the UE is configured to communicate with the base station.

37. The communication system of the previous 3 embodiments, wherein: the processing circuitry of the host computer is configured to execute a host application, thereby providing the user data; and the UE comprises processing circuitry configured to execute a client application associated with the host application.

38. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of embodiments 12 to 24.

39. The method of the previous embodiment, further comprising, at the base station, transmitting the user data.

40. The method of the previous 2 embodiments, wherein the user data is provided at the host computer by executing a host application, the method further comprising, at the UE, executing a client application associated with the host application.

41. A user equipment (UE) configured to communicate with a base station, the UE comprising a radio interface and processing circuitry configured to performs the of the previous 3 embodiments.

42. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of embodiments 1 to 11.

43. The communication system of the previous embodiment, wherein the cellular network further includes a base station configured to communicate with the UE.

44. The communication system of the previous 2 embodiments, wherein: the processing circuitry of the host computer is configured to execute a host application, thereby providing the user data; and the UE's processing circuitry is configured to execute a client application associated with the host application.

45. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of embodiments 1 to 11.

46. The method of the previous embodiment, further comprising at the UE, receiving the user data from the base station.

47. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of embodiments 1 to 11.

48. The communication system of the previous embodiment, further including the UE.

49. The communication system of the previous 2 embodiments, further including the base station, wherein the base station comprises a radio interface configured to communicate with the UE and a communication interface configured to forward to the host computer the user data carried by a transmission from the UE to the base station.

50. The communication system of the previous 3 embodiments, wherein: the processing circuitry of the host computer is configured to execute a host application; and the UE's processing circuitry is configured to execute a client application associated with the host application, thereby providing the user data.

51. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

52. A method implemented in a communication system including a host computer, a base station and a user equipment (UE), the method comprising: at the host computer, receiving user data transmitted to the base station from the UE, wherein the UE performs any of the steps of any of embodiments 1 to 11.

53. The method of the previous embodiment, further comprising, at the UE, providing the user data to the base station.

54. The method of the previous 2 embodiments, further comprising: at the UE, executing a client application, thereby providing the user data to be transmitted; and at the host computer, executing a host application associated with the client application.

55. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

56. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 12 to 24.

57. The communication system of the previous embodiment further including the base station.

58. The communication system of the previous 2 embodiments, further including the UE, wherein the UE is configured to communicate with the base station.

59. The communication system of the previous 3 embodiments, wherein: the processing circuitry of the host computer is configured to execute a host application; the UE is configured to execute a client application associated with the host application, thereby providing the user data to be received by the host computer.

60. A method implemented in a communication system including a host computer, a base station and a user equipment (UE), the method comprising: at the host computer, receiving, from the base station, user data originating from a transmission which the base station has received from the UE, wherein the UE performs any of the steps of any of embodiments 1 to 11.

61. The method of the previous embodiment, further comprising at the base station, receiving the user data from the UE.

62. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method performed by a wireless device, the method comprising:

receiving a first Downlink Semi-Persistent Scheduling, DL SPS, assignment and a second DL SPS assignment from a network node, wherein at least one resource associated with the first DL SPS assignment and at least one resource associated with the second DL SPS assignment are at least partially overlapping;

comparing priority information associated with each of the first DL SPS assignment and the second DL SPS assignment;

selecting a one of the first DL SPS assignment and the second DL SPS assignment that has a higher priority based on the priority information;

attempting to decode a Physical Downlink Shared Channel, PDSCH, according to the selected one of the first DL SPS assignment and the second DL SPS assignment that has the higher priority, wherein the priority information comprises a first SPS configuration index associated with the first DL SPS assignment and a second SPS configuration index associated with the second DL SPS assignment;

obtaining a third DL SPS assignment from the network node;

deactivating the first DL SPS assignment and the second DL SPS assignment for all occasions wherein the at least one resource associated with the first DL SPS assignment and the at least one resource associated with the second DL SPS assignment overlaps; and using only the third DL SPS assignment for all occasions when the at least one resource associated with the first DL SPS assignment and the at least one resource associated with the second DL SPS assignment overlaps.

2. The method of claim 1, wherein the priority information comprises receiving priority indicators from the network node;

wherein the priority indicators are received in downlink control information, DCI.

3. The method of claim 1, wherein the priority information comprises information associated with at least one of:

a Hybrid Automatic Repeat Request process Identifier, HARQ ID, offset of a configuration of the first DL SPS assignment and a HARQ ID offset of a configuration of the second DL SPS assignment;

transmission parameters in an activation downlink control information, DCI, the transmission parameters comprising reliability parameters and transmission duration; and time-frequency resource or demodulation and decoding parameters.

4. The method of claim 1, wherein the wireless device is configured with separate Hybrid Automatic Repeat Request, HARQ, process pools for the first and second DL SPS assignments.

5. The method of claim 1, wherein the at least one resource associated with the first DL SPS assignment and the at least one resource associated with the second DL SPS assignment are at least partially overlapping when the at least one resource associated with the first DL SPS assignment and the at least one resource associated with the second DL SPS assignment overlap in a frequency domain, a time domain, or both the frequency and time domains.

6. The method of claim 1, wherein at least one resource associated with the first DL SPS assignment and the at least one resource associated with the second DL SPS assignment are at least partially overlapping when there are one or more points in time when the at least one resource associated with the first DL SPS assignment and the at least one resource associated with the second DL SPS assignment overlap.

7. A method performed by a base station, the method comprising:

granting a first Downlink Semi-Persistent Scheduling, DL SPS, assignment and a second DL SPS assignment to a wireless device, wherein at least one resource associated with the first DL SPS assignment and at least one resource associated with the second DL SPS assignment are at least partially overlapping;

transmitting downlink, DL, data to the wireless device using only a one of the first DL SPS assignment and second DL SPS assignment that has a higher priority based on priority information associated with the first and second DL SPS assignments, wherein the priority information comprises a first SPS configuration index associated with the first DL SPS assignment and a second DL SPS configuration index associated with the second DL SPS assignment;

transmitting, to the wireless device, a third DL SPS assignment for prioritizing over the first and second DL SPS assignments for all occasions when the at least one resource associated with the first DL SPS assignment and the at least one resource associated with the second DL SPS assignment overlap; and using only the third DL SPS assignment for all occasions when the at least one resource associated with the first DL SPS assignment and the at least one resource associated with the second DL SPS assignment overlap.

8. The method of claim 7, further comprising transmitting the priority information to the wireless device, and wherein the priority information comprises priority indicators indicating the one of the first DL SPS assignment and the second DL SPS assignment to prioritize and/or wherein the priority indicators are transmitted in downlink control information, DCI.

9. The method of claim 7, wherein the priority information comprises information associated with at least one of:

a Hybrid Automatic Repeat Request process Identifier, HARQ ID, offset of a configuration of the first DL SPS assignment and a HARQ ID offset of a configuration of the second DL SPS assignment;

transmission parameters in an activation downlink control information, DCI, the transmission parameters comprising reliability parameters and transmission duration; and time-frequency resource or demodulation and decoding parameters.

10. The method of claim 7, wherein the at least one resource associated with the first DL SPS assignment and the at least one resource associated with the second DL SPS assignment at least partially overlap in a frequency domain, a time domain, or both the frequency and time domain.

11. The method of claim 7, further comprising:

transmitting a dynamic DL assignment to the wireless device for prioritization over the first and second DL SPS assignments during at least one further instance when the at least one resource associated with the first DL SPS assignment and the at least one resource associated with the second DL SPS assignment overlap.

12. The method of claim 7, further comprising:

granting a fourth DL SPS assignment including a transport block size that is equal to or greater than transport block sizes of the first and second DL SPS assignments; and transmitting downlink, DL, data to the wireless device using only the fourth DL SPS assignment for all occasions when the at least one resource associated with the first DL SPS assignment and the at least one resource associated with the second DL SPS assignment overlap.

13. A wireless device comprising:

processing circuitry configured to:

receive a first Downlink Semi-Persistent Scheduling, DL SPS, assignment and a second DL SPS assignment from a network node, wherein at least one resource associated with the first DL SPS assignment and at least one resource associated with a second DL SPS assignment are at least partially overlapping;

compare priority information associated with each of the first DL SPS assignment and the second DL SPS assignment;

select a one of the first DL SPS assignment and the second DL SPS assignment that has a higher priority based on the priority information;

attempt to decode a Physical Downlink Shared Channel, PDSCH, according to the selected one of the first DL SPS assignment and the second DL SPS assignment that has the higher priority, wherein the priority information comprises a first SPS configuration index associated with the first DL SPS assignment and a second SPS configuration index associated with the second DL SPS assignment;

obtain a third DL SPS assignment from the network node;

deactivate the first DL SPS assignment and the second DL SPS assignment for all occasions wherein the at least one resource associated with the first DL SPS assignment and the at least one resource associated with the second DL SPS assignment overlaps; and use only the third DL SPS assignment for all occasions when the at least one resource associated with the first DL SPS assignment and the at least one resource associated with the second DL SPS assignment overlaps.

14. The wireless device of claim 13, wherein the priority information comprises receiving priority indicators from the network node; and/or wherein the priority indicators are received in downlink control information, DCI.

15. The wireless device of claim 13, wherein the priority information comprises information associated with at least one of:

a Hybrid Automatic Repeat Request process Identifier, HARQ ID, offset of a configuration of the first DL SPS assignment and a HARQ ID offset of a configuration of the second DL SPS assignment;

transmission parameters in an activation downlink control information, DCI, the transmission parameters comprising reliability parameters and transmission duration; and time-frequency resource or demodulation and decoding parameters.

16. The wireless device of claim 13, wherein the wireless device is configured with separate Hybrid Automatic Repeat Request, HARQ, process pools for the first and second DL SPS assignments.

17. The wireless device of claim 13, wherein the at least one resource associated with the first DL SPS assignment and the at least one resource associated with the second DL SPS assignment are at least partially overlapping when the at least one resource associated with the first DL SPS assignment and the at least one resource associated with the second DL SPS assignment overlap in a frequency domain, a time domain, or both the frequency and time domains.

18. A base station comprising:
processing circuitry configured to:
    grant a first Downlink Semi-Persistent Scheduling, DL SPS, assignment and a second DL SPS assignment to a wireless device, wherein at least one resource associated with the first DL SPS assignment and at least one resource associated with the second DL SPS assignment are at least partially overlapping;
    transmit downlink, DL, data to the wireless device using only a one of the first DL SPS assignment and second DL SPS assignment that has a higher priority based on priority information associated with the first and second DL SPS assignments, wherein the priority information comprises a first SPS configuration index associated with the first DL SPS assignment and a second DL SPS configuration index associated with the second DL SPS assignment;
    transmit, to the wireless device, a third DL SPS assignment for prioritizing over the first and second DL SPS assignments for all occasions when the at least one resource associated with the first DL SPS assignment and the at least one resource associated with the second DL SPS assignment overlap; and
    use only the third DL SPS assignment for all occasions when the at least one resource associated with the first DL SPS assignment and the at least one resource associated with the second DL SPS assignment overlap.

19. The base station of claim 18, wherein the priority information comprises information associated with at least one of:
    a Hybrid Automatic Repeat Request process Identifier, HARQ ID, offset of a configuration of the first DL SPS assignment and a HARQ ID offset of a configuration of the second DL SPS assignment;
    transmission parameters in an activation downlink control information, DCI, the transmission parameters comprising reliability parameters and transmission duration; and
    time-frequency resource or demodulation and decoding parameters.

20. The base station of claim 18, wherein the at least one resource associated with the first DL SPS assignment and the at least one resource associated with the second DL SPS assignment at least partially overlap in a frequency domain, a time domain, or both the frequency and time domain.

21. The base station of claim 18, wherein:
    the first and second DL SPS configurations are different based on at least one of a modulation coding scheme and a transport size; and
    determining to transmit on the one of the first DL SPS assignment and the second DL SPS is further based on a comparison of the at least one of the modulation coding scheme and the transport size and a requirement of the data available for transmission.

* * * * *